United States Patent
Mishuku et al.

(10) Patent No.: US 9,600,383 B2
(45) Date of Patent: Mar. 21, 2017

(54) STORAGE CONTROLLER, METHOD, AND STORAGE MEDIUM

(71) Applicant: FUJITSU LIMITED, Kawasaki-shi, Kanagawa (JP)

(72) Inventors: Yoshimasa Mishuku, Yokohama (JP); Hidejirou Daikokuya, Kawasaki (JP); Kenichi Fujita, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/980,090

(22) Filed: Dec. 28, 2015

(65) Prior Publication Data

US 2016/0224446 A1    Aug. 4, 2016

(30) Foreign Application Priority Data

Feb. 2, 2015    (JP) .................................. 2015-018855

(51) Int. Cl.
G06F 11/00    (2006.01)
G06F 11/20    (2006.01)
G06F 11/16    (2006.01)

(52) U.S. Cl.
CPC ...... *G06F 11/2092* (2013.01); *G06F 11/1662* (2013.01); *G06F 11/2071* (2013.01); *G06F 11/2082* (2013.01); *G06F 2201/805* (2013.01)

(58) Field of Classification Search
USPC ........................................................ 714/6.21
See application file for complete search history.

(56) References Cited

U.S. PATENT DOCUMENTS

| 8,812,800 B2 * | 8/2014 | Usami ..................... G06F 3/061 711/111 |
| 2003/0126107 A1 | 7/2003 | Yamagami |
| 2006/0036904 A1 * | 2/2006 | Yang .................. G06F 11/1076 714/6.32 |
| 2006/0236050 A1 | 10/2006 | Sugimoto et al. |
| 2006/0248304 A1 | 11/2006 | Hosouchi et al. |
| 2008/0320051 A1 | 12/2008 | Murotani et al. |
| 2009/0271582 A1 | 10/2009 | Ninose |
| 2011/0197040 A1 | 8/2011 | Oogai et al. |

(Continued)

FOREIGN PATENT DOCUMENTS

| JP | 2003-233518 | 8/2003 |
| JP | 2006-285919 | 10/2006 |

(Continued)

*Primary Examiner* — Sarai Butler
(74) *Attorney, Agent, or Firm* — Fujitsu Patent Center

(57) ABSTRACT

A storage controller out of a plurality of storage controllers used in a storage system, each of the plurality of storage controllers being configured to control mirror processing of data, the storage controller comprising: circuitry configured to: determine a storage controller of a destination of an input and output request for a volume, out of the plurality of storage controllers, based on mirror device information where identifiers and priorities of the respective storage controllers are stored while being associated with each other for each of mirror processing units, and state information being for each of storage controllers and indicating whether the storage controller is normal or not, and issue the input and output request to the determined storage controller.

18 Claims, 23 Drawing Sheets

(56) References Cited

U.S. PATENT DOCUMENTS

2014/0089730 A1* 3/2014 Watanabe ........... G06F 11/2094
714/6.22
2015/0212897 A1* 7/2015 Kottomtharayil ... G06F 11/1448
714/20

FOREIGN PATENT DOCUMENTS

| JP | 2006-309638 | 11/2006 |
|----|-------------|---------|
| JP | 2009-3499   | 1/2009  |
| JP | 2009-266120 | 11/2009 |
| JP | 2011-164800 | 8/2011  |

* cited by examiner

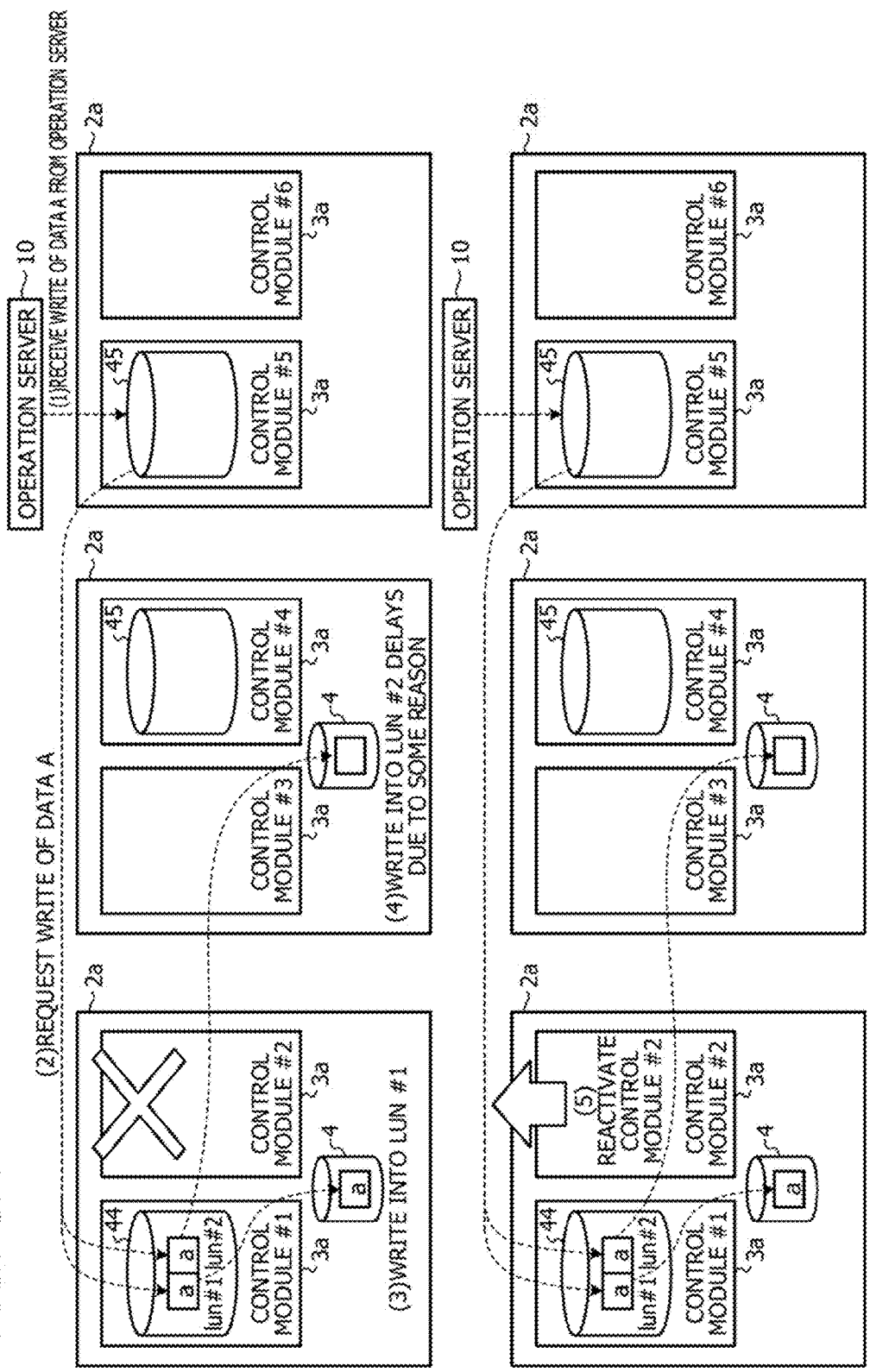

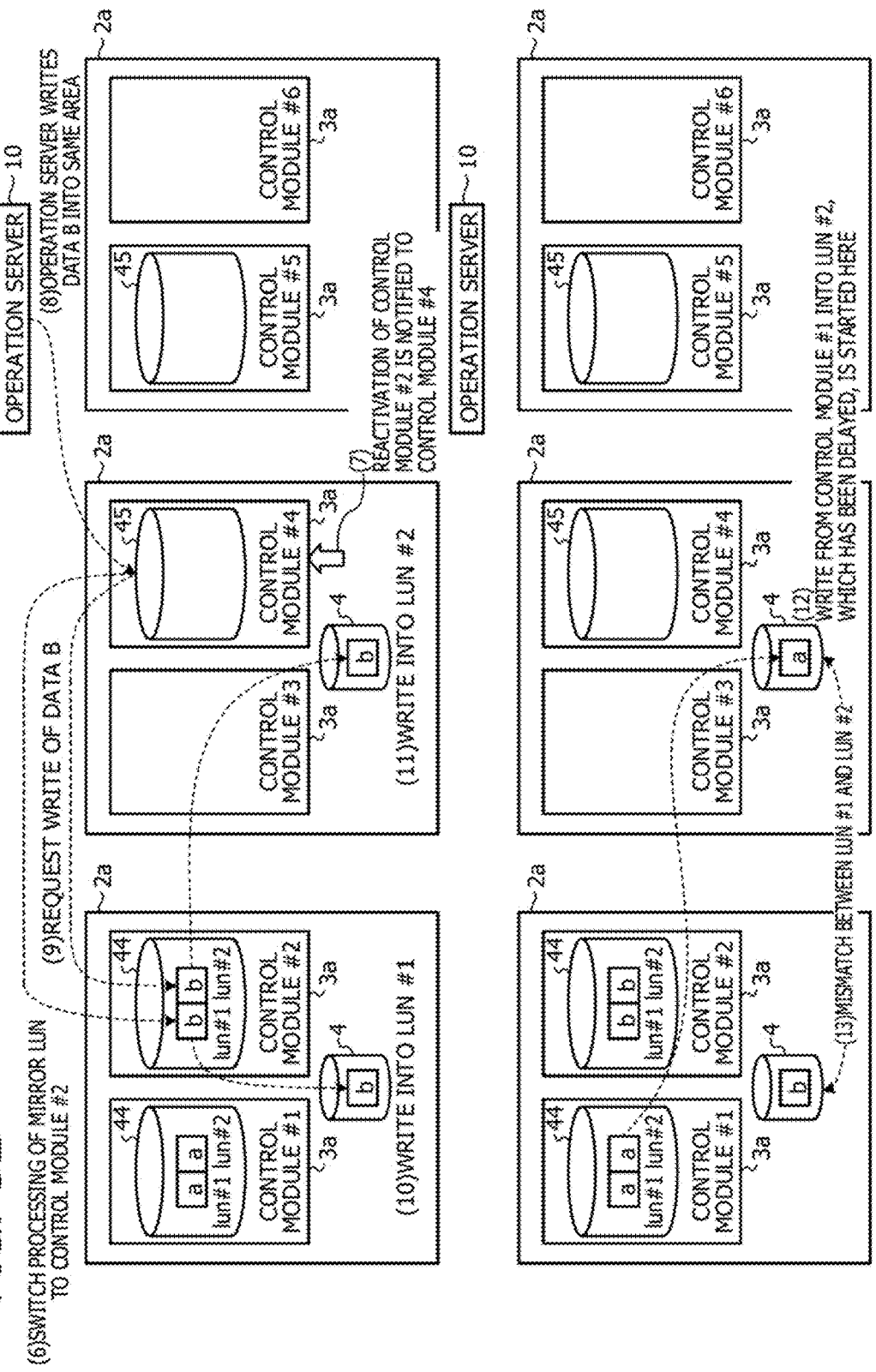

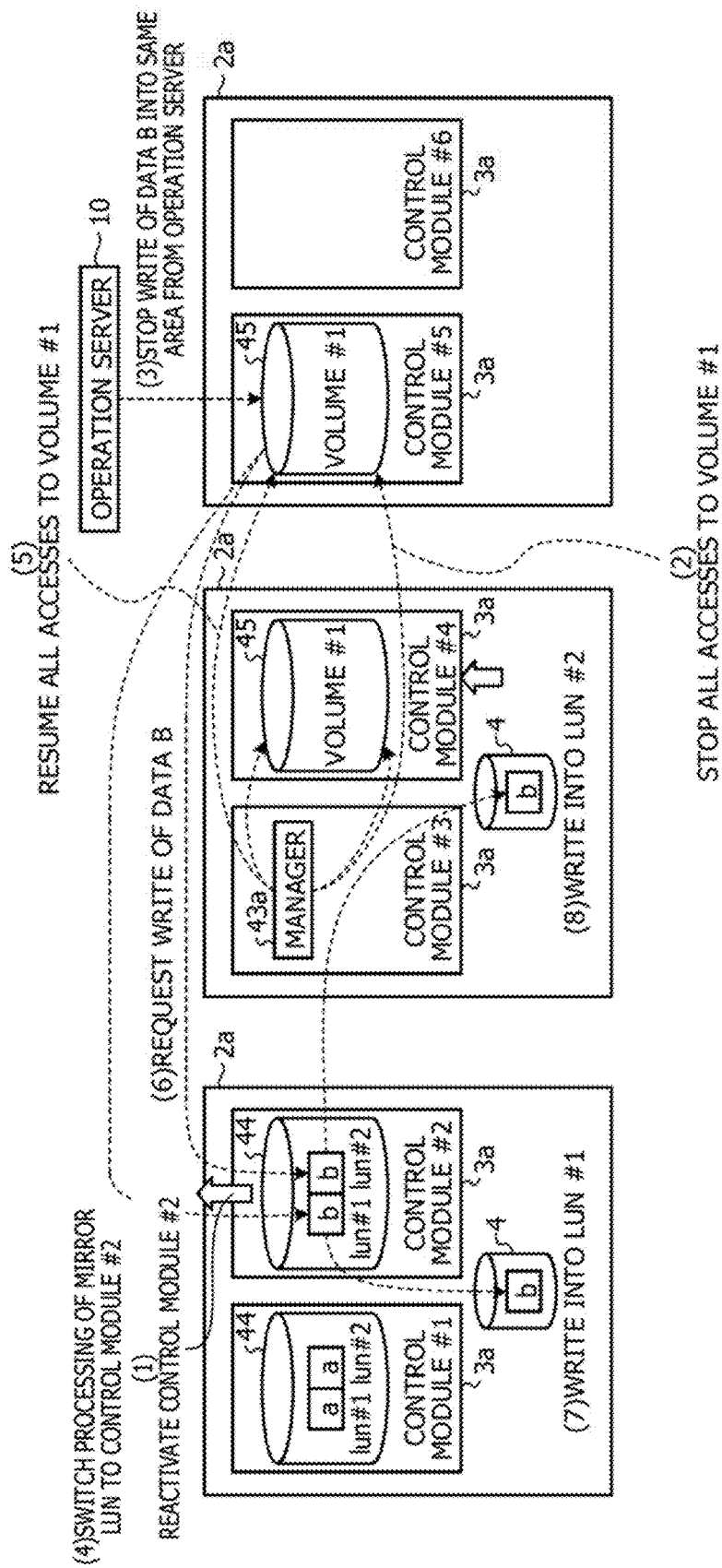

FIG. 7

| IDENTIFIER | STATE INFORMATION |
|---|---|
| 1 | X |
| 2 | ○ |
| ⋮ | ⋮ |
| 6 | ○ |

FIG. 8

| GROUP NUMBER | NORMAL IDENTIFIER | BUDDY IDENTIFIER |
|---|---|---|
| 1 | 1 | 2 |
| 2 | 3 | 4 |
| ⋮ | ⋮ | ⋮ |

…

STORAGE CONTROLLER, METHOD, AND STORAGE MEDIUM

CROSS-REFERENCE TO RELATED APPLICATION

This application is based upon and claims the benefit of priority of the prior Japanese Patent Application No. 2015-018855, filed on Feb. 2, 2015, the entire contents of which are incorporated herein by reference.

FIELD

The embodiments discussed herein are related to a storage controller, a method, and a storage medium.

BACKGROUND

In a storage system comprising multiple storage controllers, the access method from an operation server utilizing the storage system includes an active-standby method and an active-active method. In the active-standby method, only one active storage controller receives an access request from the operation server utilizing the storage system. On the other hand, in the active-active method, any storage controller may receive the access request from the operation server.

Although the processing for the access request from the operation server is complicated, demand for the active-active storage system is apt to increase for advantages of the active-active method such as that load applied to the storage controller is distributed and a failure may be restored promptly.

As for the volume switching, a technique is known that suppresses exhaustion of the in-host ID by switching an access request for a switching source volume to a switching destination volume with reference to a switching table that associates the in-host ID of the switching source volume and the in-storage ID of the switching destination volume with each other.

Also, a technique is known that executes a first remote copy on the storage basis in the normal state, and when a failure occurs in the first remote copy, enables failure handling by switching to a second remote copy on the host basis while suppressing the load to the host.

Further, a technique is known that, when an I/O request to a first volume out of a pair of volumes of the remote copy is failed, transmits the I/O request to a second volume to update the second volume and thereby improve the availability of the system.

As examples of the related techniques, Japanese Laid-open Patent Publication Nos. 2006-309638, 2006-285919, and 2009-266120 are known.

SUMMARY

According to an aspect of the invention, a storage controller out of a plurality of storage controllers used in a storage system, each of the plurality of storage controllers being configured to control mirror processing of data, the storage controller includes: circuitry configured to: determine a storage controller of a destination of an input and output request for a volume, out of the plurality of storage controllers, based on mirror device information where identifiers and priorities of the respective storage controllers are stored while being associated with each other for each of mirror processing units, and state information being for each of storage controllers and indicating whether the storage controller is normal or not, and issue the input and output request to the determined storage controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams for illustrating examples of synchronization destruction;

FIG. 4 is a diagram for illustrating a method of maintaining the synchronization by a manager;

FIG. 7 illustrates an example of a module management table;

FIG. 8 illustrates an example of a mirror LUN management table;

DESCRIPTION OF EMBODIMENTS

An active-active storage system has a problem in that the processing for maintaining the synchronization of the storage system takes a time when a failure occurs in the storage controller. Destruction of the synchronization in the storage system means that the two data mirrored for a redundancy become not equal.

According to an aspect of the embodiment, the active-active storage system reduces the processing time when a failure occurs in a storage controller.

Hereinafter, embodiments of a storage controller and a storage control program disclosed herein are described in detail with reference to the accompanying drawings. The embodiments shall not limit the technique disclosed herein.

EMBODIMENTS

Figure 1:
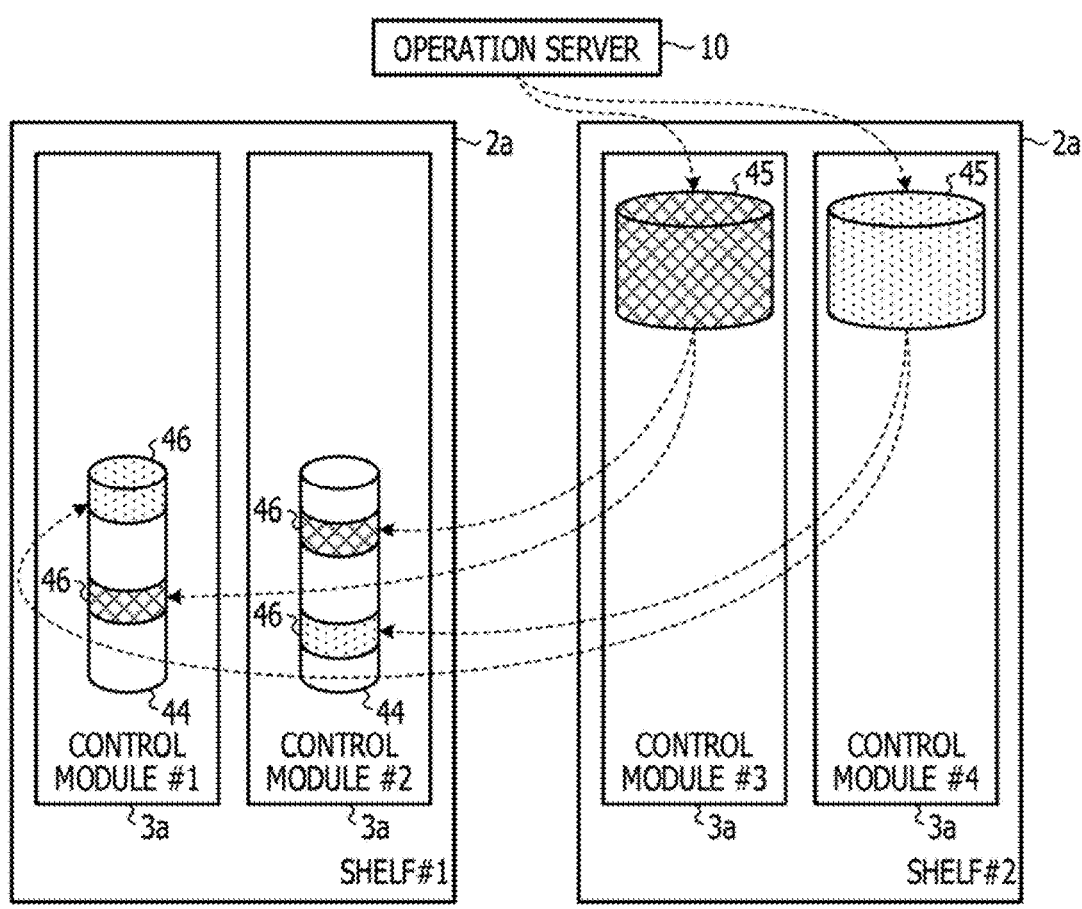
FIG. 1 is a diagram for illustrating a mirror LUN.

First, a mirror logical unit number (LUN) for configuring a mirror volume without destructing the synchronization in an active-active storage system is described. FIG. 1 is a diagram for illustrating the mirror LUN.

In FIG. 1, the storage system comprises two shelves 2a. The each shelf 2a is a chassis configured to accommodate two control modules 3a and multiple disk devices identified with the LUN. In FIG. 1, the disk devices are omitted. The two shelves 2a are represented as a shelf #1 and a shelf #2, and the four control modules 3a are represented as a control module #1 to a control module #4.

The mirror LUN 44 is a virtual disk device integrating multiple segment groups 46, and one mirror LUN 44 exists in one control module 3a. Here, the segment group 46 is a processing unit of the mirroring, which consists of multiple segments. The segment is a management unit of the disk area. Each segment group 46 belongs to a mirror LUN. However, in FIG. 1, the mirror LUN is duplicated, and one segment group 46 belongs to the both mirror LUNs 44 of the control module #1 and a mirror LUN 44 of the control module #2. Mirror LUNs 44 existing in the control module #3 and the control module #4 are omitted.

An operation server 10 utilizing the storage system requests the control module 3a for access to a volume 45 provided by the storage system. In FIG. 1, for example, the operation server 10 requests the control module #3 and the control module #4 for access to the volume 45. Upon receiving the access request from the operation server 10, the control module 3a transmits the access request to a control module 3a comprising a mirror LUN 44 to which a segment group 46 including an access area of the volume 45 belongs. That is, upon receiving the access request from the operation server 10, the control module 3a virtually issues the access request to a mirror LUN 44 to which a segment group 46 including the access area of the volume 45 belongs. In FIG. 1, the access requests are issued to the control module #1 and the control module #2.

Then, the control module 3a, to which the access request is issued, performs a processing of the mirror LUN 44, that is a processing of mirroring the segment group 46 designated in the access request. When the access request is for writing data into the segment group 46, the control module 3a, to which the access request is issued, controls such that the control module 3a comprising the mirror LUN 44 writes data into two disk devices.

Thus, the synchronization of the active-active storage system is maintained by executing access from the operation server 10 to the volume 45 via the mirror LUN. If the mirroring is performed by a control module 3a that has received the request from the operation server 10 without passing through the mirror LUN 44, the synchronization may be destructed depending on the timing when multiple control modules 3a write different data into the same segment group 46.

Figure 2:
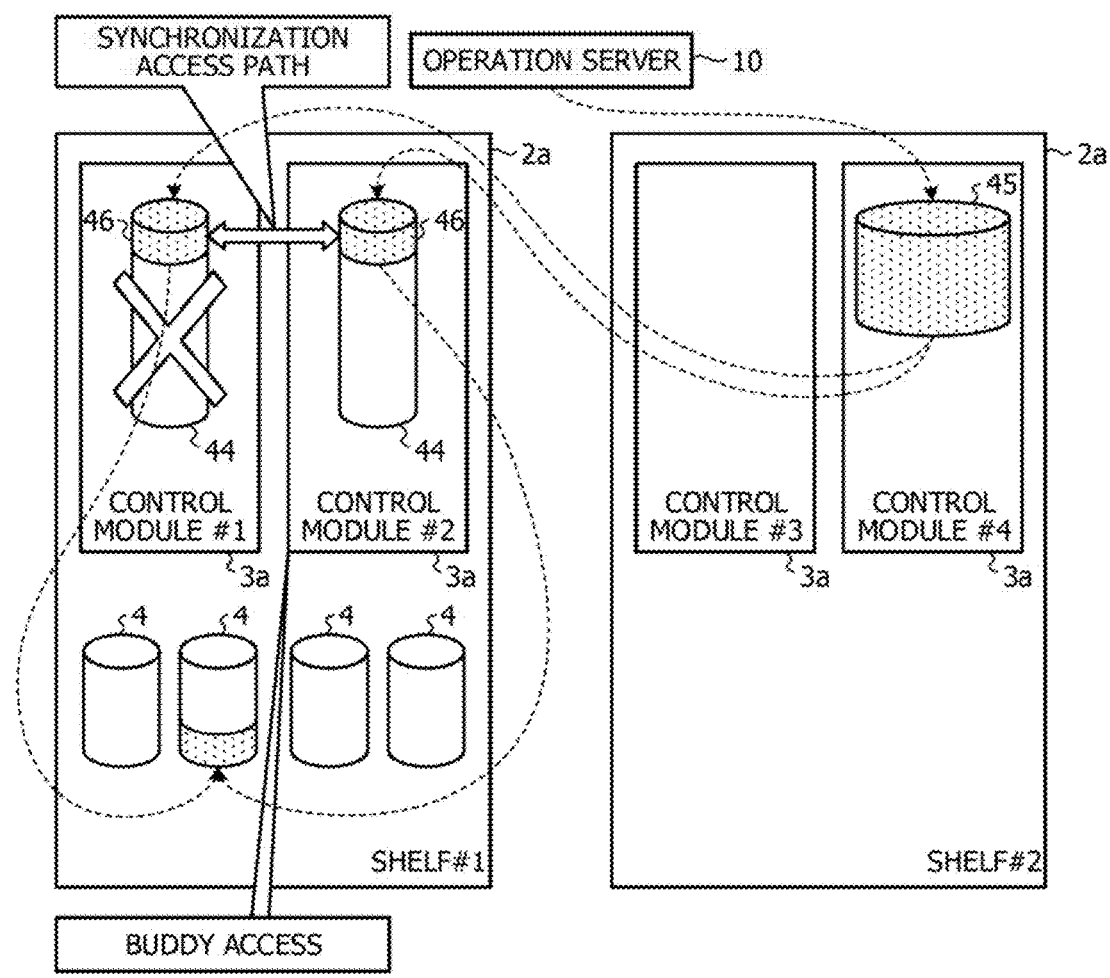
FIG. 2 is a diagram for illustrating a switching of an access path to the mirror LUN when a control module is down.

Next, a switching of an access path to the mirror LUN 44 when the control module 3a is down is described. FIG. 2 is a diagram for illustrating the switching of the access path to the mirror LUN 44 when the control module 3a is down. In FIG. 2, a shelf #1 includes four disk devices 4.

As illustrated in FIG. 2, when a control module #1 is down, the access path to the mirror LUN 44 is switched to a control module #2 that is a buddy control module 3a. In this case, the buddy control module 3a is another control module 3a in the same shelf 2a. In FIG. 2, the buddy control module 3a of the control module #1 is the control module #2, and the buddy control module 3a of the control module #2 is the control module #1.

When the control module #1 is down, the control module #2 takes over the access of the control module #1 to the mirror LUN 44. That is, a control module 3a, which receives the access request from the operation server 10, switches the access to the mirror LUN 44 of the control module #1 to the control module #2. In FIG. 2, a control module #4 switches the access to the mirror LUN 44 of the control module #1 to the control module #2.

Then, instead of the control module #1, the control module #2 makes the access to the disk devices 4. The access of the control module #2 to the disk device 4 in place of the control module #1 is called a buddy access. In FIG. 2, access to the mirror disk devices 4 is omitted for the convenience of explanation.

Thus, when a control module 3a including the mirror LUN is down, operation of the storage system is continued by switching the access via the mirror LUN to the buddy access. Then, when the failed control module 3a is restarted, the storage system switches the buddy access to the original normal access.

However, the synchronization may be destructed when switching the access path from the buddy access to the normal access. FIGS. 3A and 3B are diagrams for illustrating examples of the synchronization destruction. FIG. 3A illustrates a scenario where the control module #2 is down and the control module #1 works as a buddy control module 3a.

As illustrated in FIG. 3A, upon receiving Write of data A to a volume 45 from the operation server 10 (1), a control module #5 requests write of data A into the control module #1 that is the buddy control module 3a (2). Then, the control module #1 performs mirror control so as to write data A into two disk devices 4. In FIG. 3A, LUNs of two disk devices 4 into which data is written are represented as a LUN #1 and a LUN #2.

Then, data A is written into the LUN #1 (3). Here, write of data A into the LUN #1 represents writing of data A into a disk device 4 having a LUN as the LUN #1. Hereinafter, the disk device having a LUN as a LUN #n (n is an integer) is merely referred to as the LUN #n.

Meanwhile, assume that writing of data A into the LUN #2 delays due to some reason (4). Then, assume that the control module #2 is reactivated during the delay (5). Then, as illustrated in FIG. 3B, processing of the mirror LUN is switched to the control module #2 (6), and reactivation of the control module #2 is notified to the control module #4 (7). Then, when the operation server 10 requests the control module #4 for Write of data B into the same area (8), the control module #4 requests write of data B into the reactivated control module #2 (9).

Then, data B is written into the LUN #1 (10), and data B is written into the LUN #2 (11). Thereafter, writing of data A from the control module #1 to the LUN #2, which has been delayed, is started (12).

Thus, if writing of data A by the buddy control module 3a is delayed due to some reason, data A may be written after data B from the reactivated control module 3a is written, and this may cause mismatching between the LUN #1 and the LUN #2 (13).

To avoid occurrence of such a problem, a method of maintaining the synchronization by the manager is adopted. Here, the manager is a module that controls an entire storage system. The manager operates in one of the multiple control modules 3a. FIG. 4 is a diagram for illustrating a method of maintaining the synchronization by the manager. In FIG. 4, a manager 43a operates in the control module #3.

As illustrated in FIG. 4, when the control module #2 is reactivated (1), the manager 43a stops all accesses to a volume #1 (2). Here, the volume #1 is a volume 45 with the access area included in a mirror LUN 44 existing in the switched control module 3a.

Then, Write of data B from the operation server 10 to the same area is stopped (3). Then, when processing of the mirror LUN is switched to the control module #2 (4), the manager 43a resumes all accesses to the volume #1 (5). Then, the control module #5, which has received a request of Write of data B into the same area from the operation server 10, requests writing of data B into the reactivated control module #2 (6). Then, data B is written into the LUN #1 (7), and data B is written into the LUN #2 (8).

Thus, when a failed control module 3a is restored, the manager 43a stops access to a volume 45 with the access area included in a mirror LUN 44 existing in the failed control module 3a, and thereby avoids destruction of the synchronization.

However, this method has a problem that it takes a time for a processing by the manager 43a to calculate a volume 45 with the access area included in a mirror LUN 44 existing in the failed control module 3a and instruct respective control modules 3a to stop access. Since the mirror LUN 44 integrates segment groups 46 of many volumes 45, there are many volumes 45 with the access area included in the mirror LUN 44, and therefore, it takes a time to calculate the volumes 45 with the access area included in the mirror LUN 44. Therefore, the manager 43a becomes a bottleneck causing a prolonged I/O (Input/Output) stop time. Also, when a control module 3a operated by the manager 43a is down, the manager 43a may have to reactivate and thereby the switching is delayed.

Figure 5:
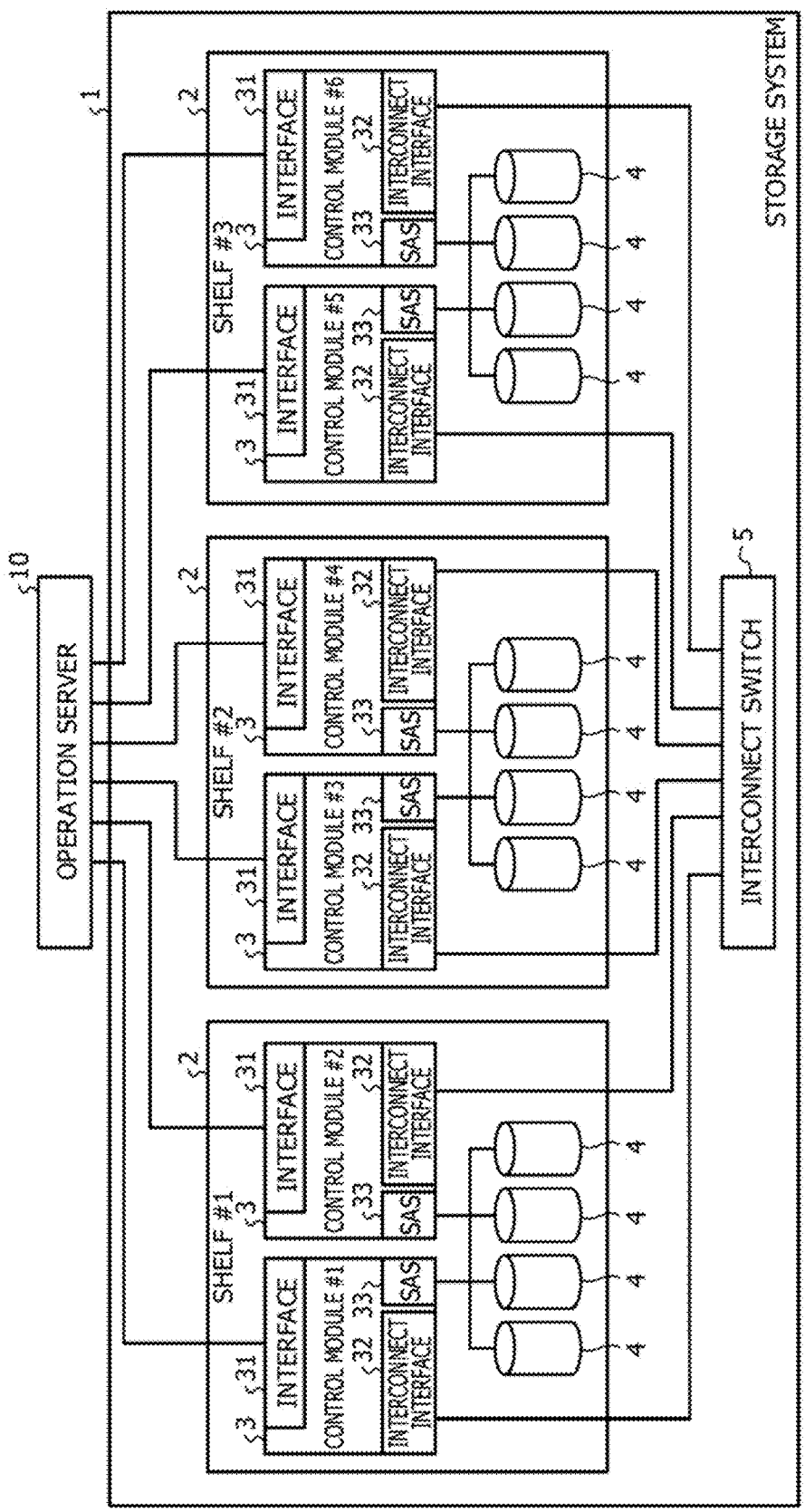
FIG. 5 illustrates a configuration of a storage system according to the embodiments.

For solving such problems, a storage system according to the embodiment is configured to control access from the operation server 10 so as to maintain the synchronization without a burden to the manager. FIG. 5 illustrates a configuration of a storage system according to the embodiment.

As illustrated in FIG. 5, a storage system 1 according to the embodiment includes three shelves 2 and a interconnect switch 5. The three shelves 2 are represented as a shelf #1 to a shelf #3. Although three shelves 2 are illustrated herein for the convenience of explanation, the storage system 1 may include any number of shelves 2.

The each shelf 2 is a chassis configured to accommodate two control modules 3 controlling the storage system 1 and four disk devices 4 identified with the LUN. Although four disk devices 4 are illustrated herein for the convenience of explanation, the shelf 2 may accommodate any number of disk devices 4. Control modules 3 accommodated by the shelf #1 are represented as a control module #1 and a control module #2, and control modules 3 accommodated by the shelf #2 are represented as a control module #3 and a control module #4. Control modules 3 accommodated by the shelf #3 are represented as a control module #5 and a control module #6.

An interconnect switch 5 is a switch configured to connect the control modules 3 to each other. The control modules 3 communicate with each other via the interconnect switch 5.

The control module 3 comprises an interface 31, an interconnect interface 32, and a serial-attached SCSI (SAS) 33. The interface 31 is a device configured to communicate with the operation server 10 utilizing the storage system. The interconnect interface 32 is a device configured to communicate with another interconnect interface 32 via the interconnect switch 5. The SAS 33 is a device configured to communicate with the disk devices 4.

The disk device 4 is a nonvolatile storage device configured to store data used by the operation server 10, which is implemented by a hard disk drive (HDD). The shelf 2 may accommodate a solid state drive (SSD) instead of the disk device 4.

Figure 6:
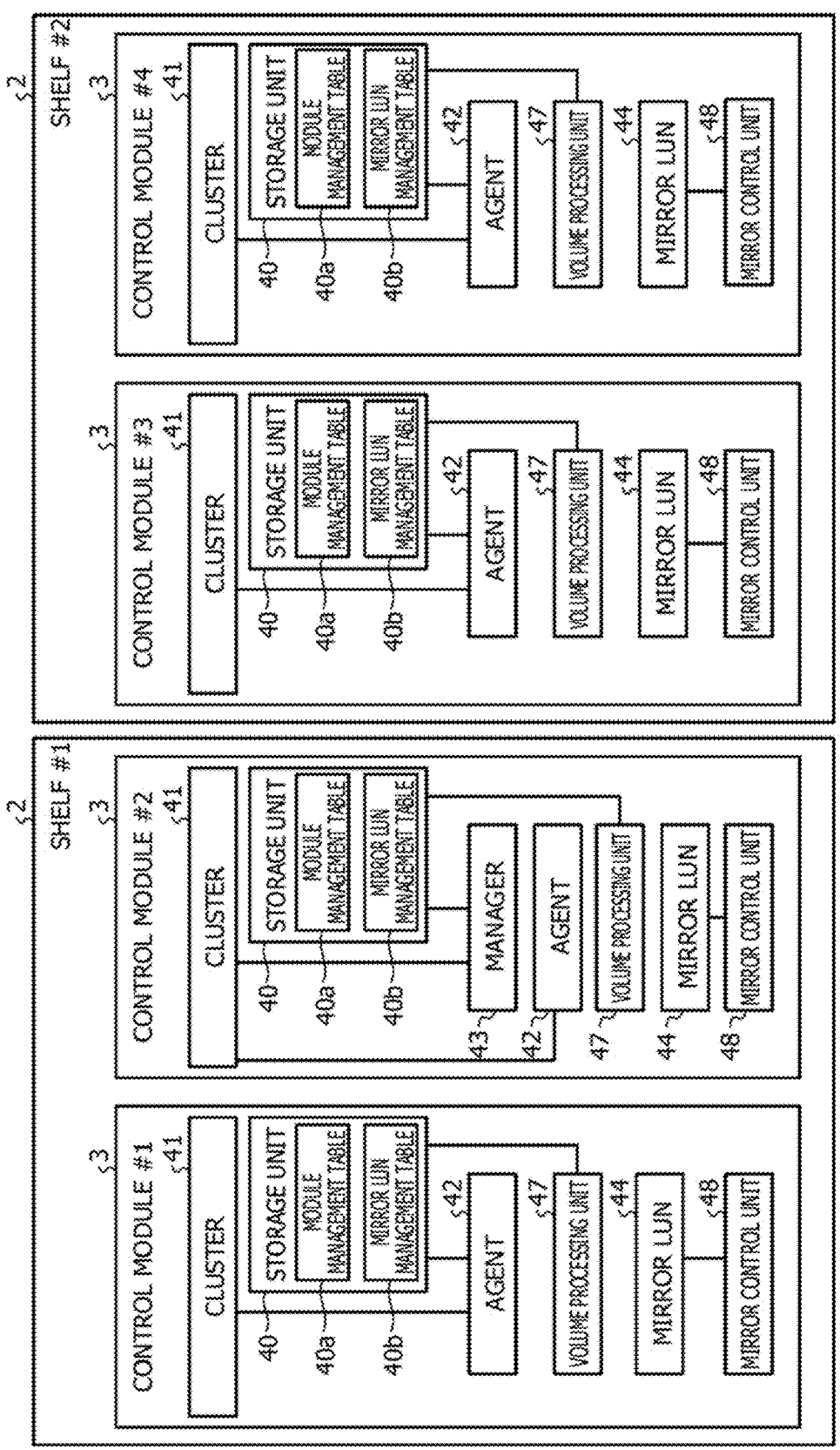
FIG. 6 illustrates a function configuration of each control module.

FIG. 6 illustrates a function configuration of respective control modules 3. In FIG. 6, the control modules 3 accommodated in the shelf #3 are not depicted for the convenience of explanation. However, the control modules 3 accommodated in the shelf #3 have the same function configuration as the control modules 3 accommodated in the shelf #2.

As illustrated in FIG. 6, each control module 3 includes a storage unit 40, a cluster 41, an agent 42, a volume processing unit 47, and a mirror control unit 48. The control module #2 further includes the manager 43. Here, the manager 43 operates in the control module #2. However, the manager 43 may operate in the other control module 3. Thus, the manager 43 operates in any one of control modules 3.

The storage unit 40 is configured to store data used for control of the storage system 1. The storage unit 40 stores a module management table 40a and a mirror LUN management table 40b. The module management table 40a is a table indicating whether each of the control modules 3 is normal or abnormal.

Figure 7:
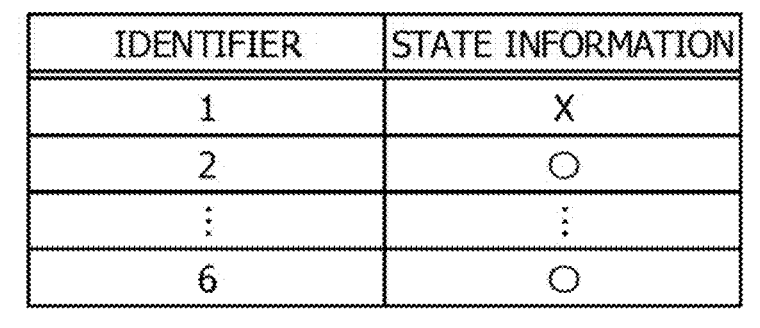

FIG. 7 illustrates an example of the module management table 40a. As illustrated in FIG. 7, the module management table 40a is a table associating identifiers and state information to each other for each of the control modules 3. The identifier is a number identifying the control module 3. The state information is information indicating whether the control module 3 is normal or abnormal. In FIG. 7, "O" indicates that the corresponding control module 3 is normal, and "x" indicates that the corresponding control module 3 is down. For example, a control module 3 identified with the identifier 1, that is, the control module #1 is down.

The mirror LUN management table 40b is a table associating the segment group 46 with the number of each of two control modules 3 in which the mirror LUN 44 exists. FIG. 8 illustrates an example of the mirror LUN management table 40b. As illustrated in FIG. 8, the mirror LUN management table 40b associates group numbers with normal identifiers and buddy identifiers. The group number is a number for identifying the segment group 46.

The normal identifier is a number for identifying a control module 3 in which a mirror LUN 44 including a corresponding segment group 46 exists. The buddy identifier is a number for identifying the buddy control module 3 used instead of a control module 3 identified with the normal identifier when the control module 3 is down. That is, the control module 3 identified with the normal identifier performs processing of the mirror LUN 44 having a priority higher than a control module 3 identified with the buddy identifier. For example, if a mirror LUN 44 including a segment group 46 having the number of 1 exists in the control module #1 and the control module #2, usually a mirror LUN 44 existing in the control module #1 is used.

The cluster 41 is configured to control a storage cluster in conjunction with the cluster 41 of the other control module 3. Here, the storage cluster is a function causing the other control module 3 to automatically take over a function of a control module 3 when a failure occurs thereto.

The agent 42 is configured to monitor the state of the control module 3 and notify the cluster 41 when an abnormal control module 3 is detected. Upon being notified of the abnormal control module 3 from the agent 42, the cluster 41 decouples the control module 3 from the storage system 1. Further, the cluster 41 notifies the failed control module 3 to all other control modules 3.

Upon being notified of the failed control module 3 from the cluster 41, the agent 42 updates the module management table 40a. Upon being notified failure of the control module 3 from the cluster 41, an agent 42 of a buddy control module 3 in the failed control module 3 performs resynchronization processing.

The volume processing unit 47 is configured to process an access request of the operation server 10 to the volume 45. With the mirror LUN management table 40b, the volume processing unit 47 identifies two control modules 3 where a mirror LUN 44 exists for an area to be accessed. Then, if a normally used control module 3 out of the identified two control modules 3 is normal, the volume processing unit 47 issues I/O to the normally used control module 3. If the normally used control module 3 is not normal, the volume processing unit 47 issues I/O to the buddy control module 3.

Here, issuing the I/O means requesting the processing of the mirror LUN 44. Further, the volume processing unit 47 determines with reference to the module management table 40a whether the control module 3 is normal.

Figure 9:
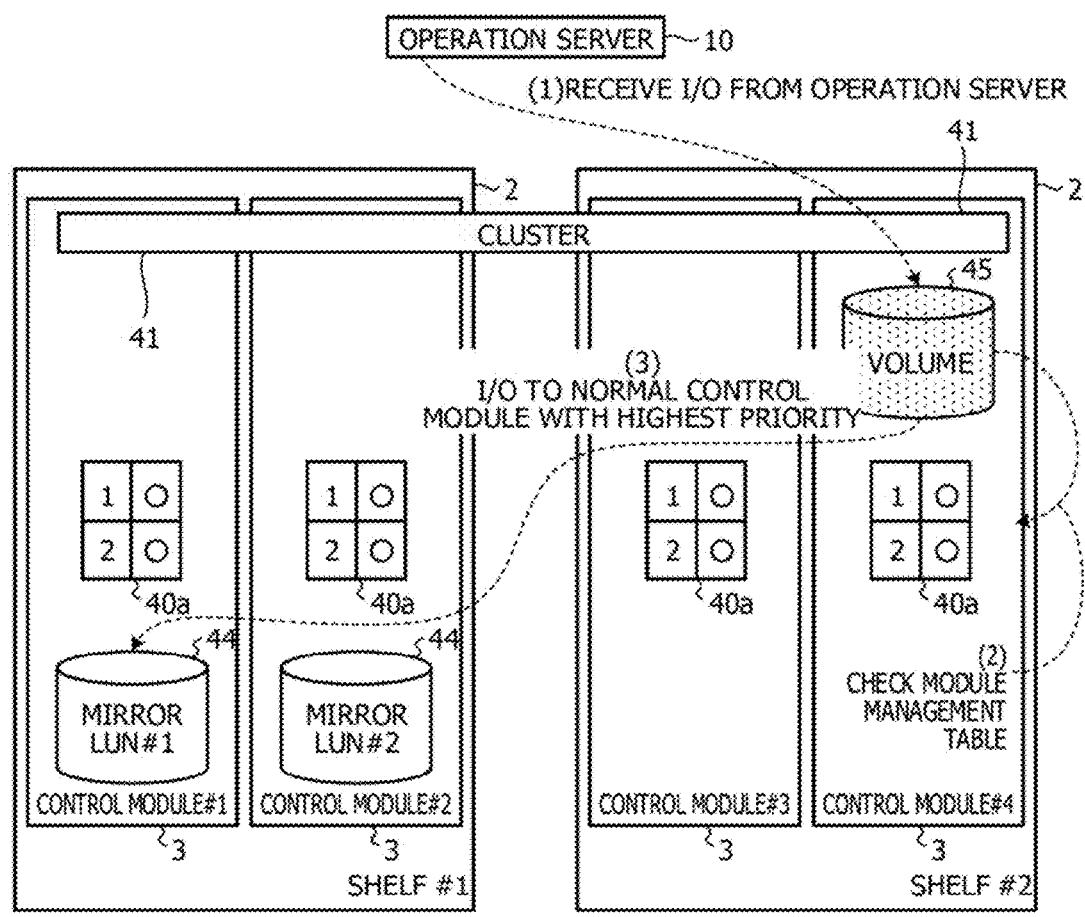
FIG. 9 is a diagram for illustrating I/O to the mirror LUN with the module management table.

FIG. 9 is a diagram for illustrating the I/O to the mirror LUN 44 with the module management table 40a. In FIGS. 9 to 14B, a mirror LUN #1 is a mirror LUN 44 which exists in a control module #1, and a mirror LUN #2 is a mirror LUN 44 which exists in a control module #2.

Upon receiving the I/O for the volume 45 from the operation server 10 (1), the volume processing unit 47 checks the module management table 40a (2). Then, the volume processing unit 47 issues the I/O to a control module 3 which is a normal control module 3 and has the highest priority (3). The priority of the normally used control module 3 is higher than the priority of the buddy control module 3. Therefore, in FIG. 9, the I/O is issued to the control module #1.

Thus, the volume processing unit 47 identifies, with reference to the module management table 40a, a control module 3 which issue the I/O. Therefore, even when a normally used control module 3 is in failure, a control module 3 which issue the I/O may be identified easily.

Figure 10A:
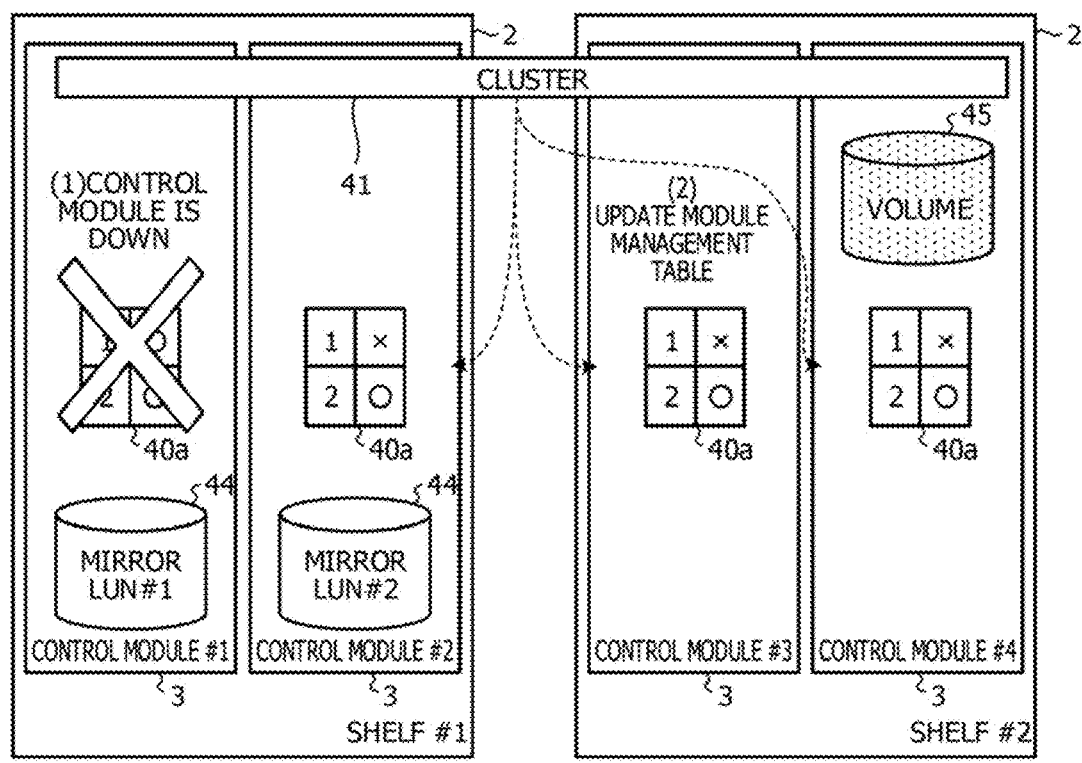
FIG. 10A is a diagram for illustrating updating of the module management table when a control module is down.
Figure 10B:
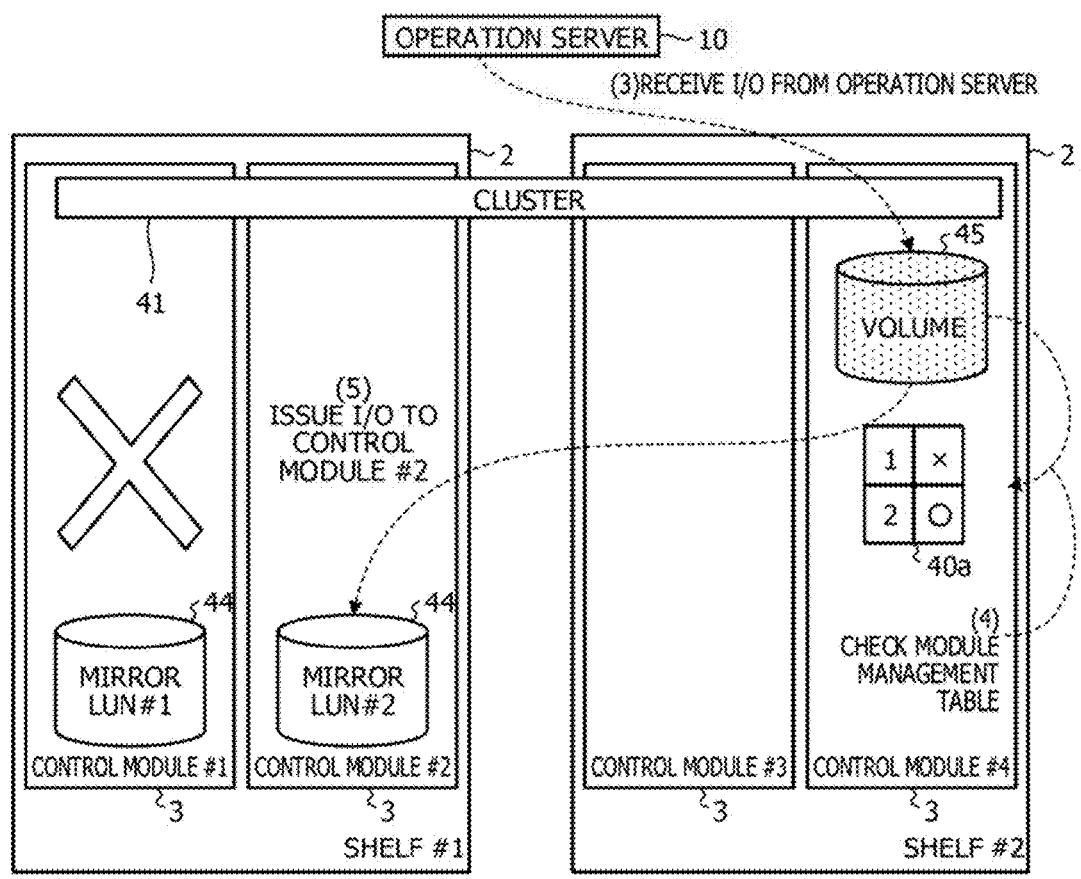
FIG. 10B is a diagram for illustrating the I/O to the mirror LUN when the control module is down.

FIG. 10A is a diagram for illustrating the updating of the module management table 40a when a control module 3 is down. FIG. 10B is a diagram for illustrating the I/O to the mirror LUN 44 when a control module 3 is down.

As illustrated in FIG. 10A, when a control module #1, to which the I/O is normally issued, is down (1), the agent 42 of all control modules 3 other than the control module #1 update the management table 40a based on a down notice from the cluster 41 (2). In FIG. 10A, the module management tables 40a of the control modules #2 to #4 are updated with x indicating that the state of the control module #1 is abnormal.

Then, as illustrated in FIG. 10B, the control module #4 receives the I/O for the volume 45 from the operation server 10 (3), and the volume processing unit 47 of the control module #4 checks the module management table 40a (4). Then, since the control module #1 is in failure, the volume processing unit 47 issues the I/O to the control module #2 which is a buddy control module 3.

Figure 11:
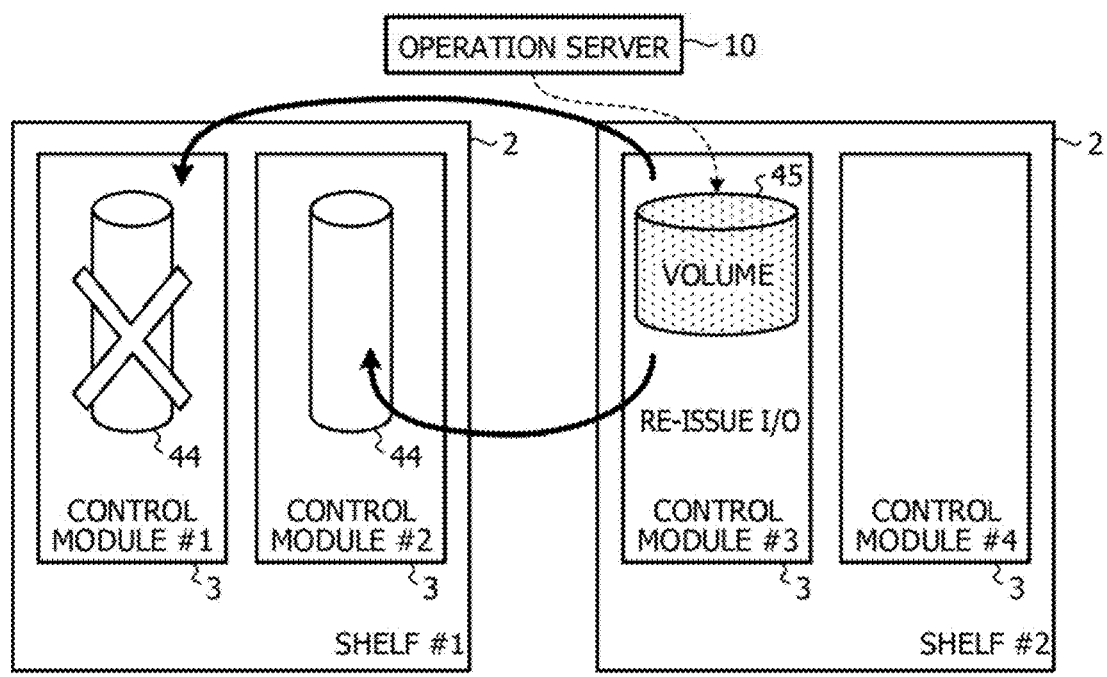
FIG. 11 is a diagram for illustrating re-issue of the I/O.

Depending on the timing when the control module #1 is down, the I/O issued to the control module #1 may be returned to the volume processing unit 47 as an error. In such a case, the volume processing unit 47 re-issues the I/O to the buddy control module 3 as illustrated in FIG. 11 so as no error returns to the operation server 10.

Referring back to FIG. 6, the mirror control unit 48 controls access to a segment group 46 included in the mirror LUN 44 and performs mirroring. If the access is for Write, the mirror control unit 48 performs writing into two disk devices 4.

The mirror control unit 48 manages a JRM segment that a just resynchronization mechanism (JRM) uses for the resynchronization. Here, the JRM segment is a collection of bits indicating whether writing is being processed for each of the segment groups 46.

Figure 12:
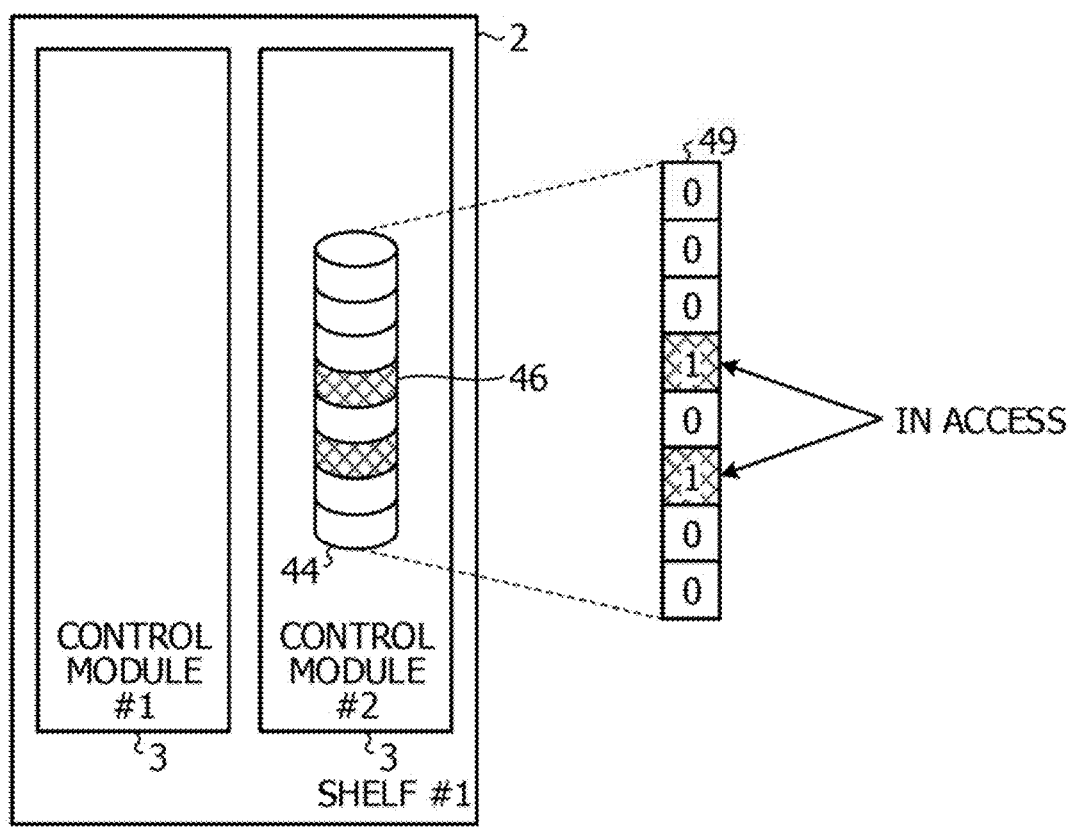
FIG. 12 is a diagram for illustrating a just resynchronization mechanism.

FIG. 12 is a diagram for illustrating the just resynchronization mechanism. When writing into the segment group 46, the mirror control unit 48 sets a corresponding bit of the JRM segment 49 to 1. Then, after completion of writing into two segment groups 46 which are in a mirror relation with each other, the mirror control unit 48 resets the corresponding bit of the JRM segment 49 to 0. Therefore, when the control module 3 is down, the synchronization of a segment group 46 with the JRM segment set to 1 may be destructed.

Then, when notified by the cluster 41 that the control module 3 is down, the agent 42 reads a JRM segment 49 managed by the failed control module 3 and performs the resynchronization processing for a segment group 46 with the JRM segment 49 set to 1. Here, the agent 42 directly reads the JRM segment 49 managed by the failed control module 3 without passing through the manager 43. That is, the JRM segment 49 is capable to be read from a buddy control module 3. The JRM segment 49 is arranged in each of the control modules 3. Since access from a buddy control module is inferior compared with normal access, usually the JRM segment 49 is accessed from the control module 3 in which the JRM segment 49 is arranged.

Figure 13:
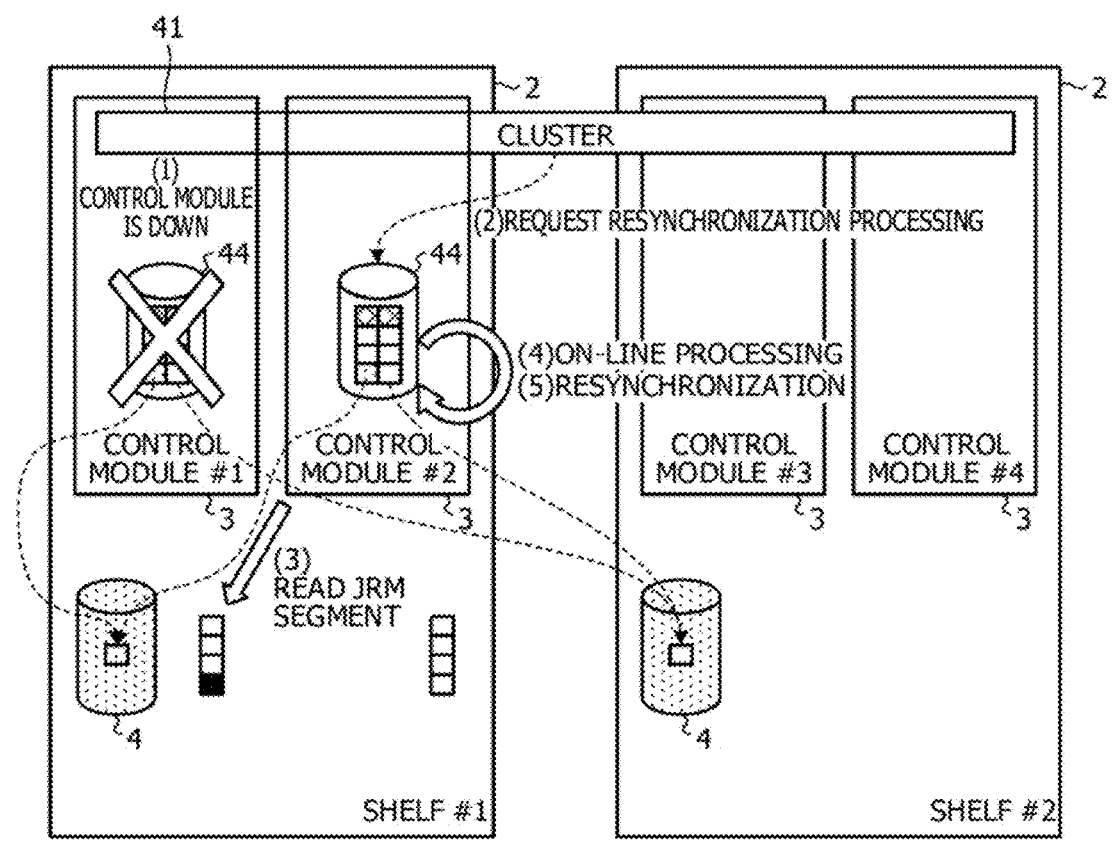
FIG. 13 is a diagram for illustrating a resynchronization processing.

FIG. 13 is a diagram for illustrating the resynchronization mechanism. As illustrated in FIG. 13, when the control module #1 is down (1), the cluster 41 requests the control module #2 which is a buddy control module 3 to perform the resynchronization processing (2). Then, the agent 42 of the control module #2 reads the JRM segment 49 (3) and performs on-line processing (4). Here, the on-line processing is a processing that enables the buddy control module 3 to receive the I/O. In the normal state, I/O to the buddy control module 3 is disabled. However, in the abnormal state, I/O to the buddy control module 3 is enabled. Then, the agent 42 performs resynchronization of two segment groups 46 which are in a mirror relation with each other (5).

However, the I/O, which comes to an area where the synchronization is not restored immediately after the on-line processing, is held, and then the held I/O is processed by the buddy control module 3 after resynchronization.

Referring back to FIG. 6, the manager 43 controls the storage system 1. The manager 43 operates in any one of control modules 3, and when a control module 3 in which the manager 43 operates is failed, a manager 43 of another control module 3 is activated by the cluster 41. Each of the control modules 3 includes one mirror LUN 44 in which a segment group 46 mirror controlled by each of the control modules 3 is defined.

When the failed control module 3 is reactivated and access to the mirror LUN 44 is switched back to the failed control module 3, the manager 43 holds the I/O in a switching source control module 3. It is for the mirror LUN 44 not to be duplicated between two control modules 3, one is a switching source and another is a switching destination, when switching back the access. The switching source control module 3 receives the I/O from the volume processing unit 47, but temporarily holds the I/O processing. Then, after completion of the switching, the control module 3 returns an error and causes the volume processing unit 47 to re-issue the I/O.

Figure 14A:
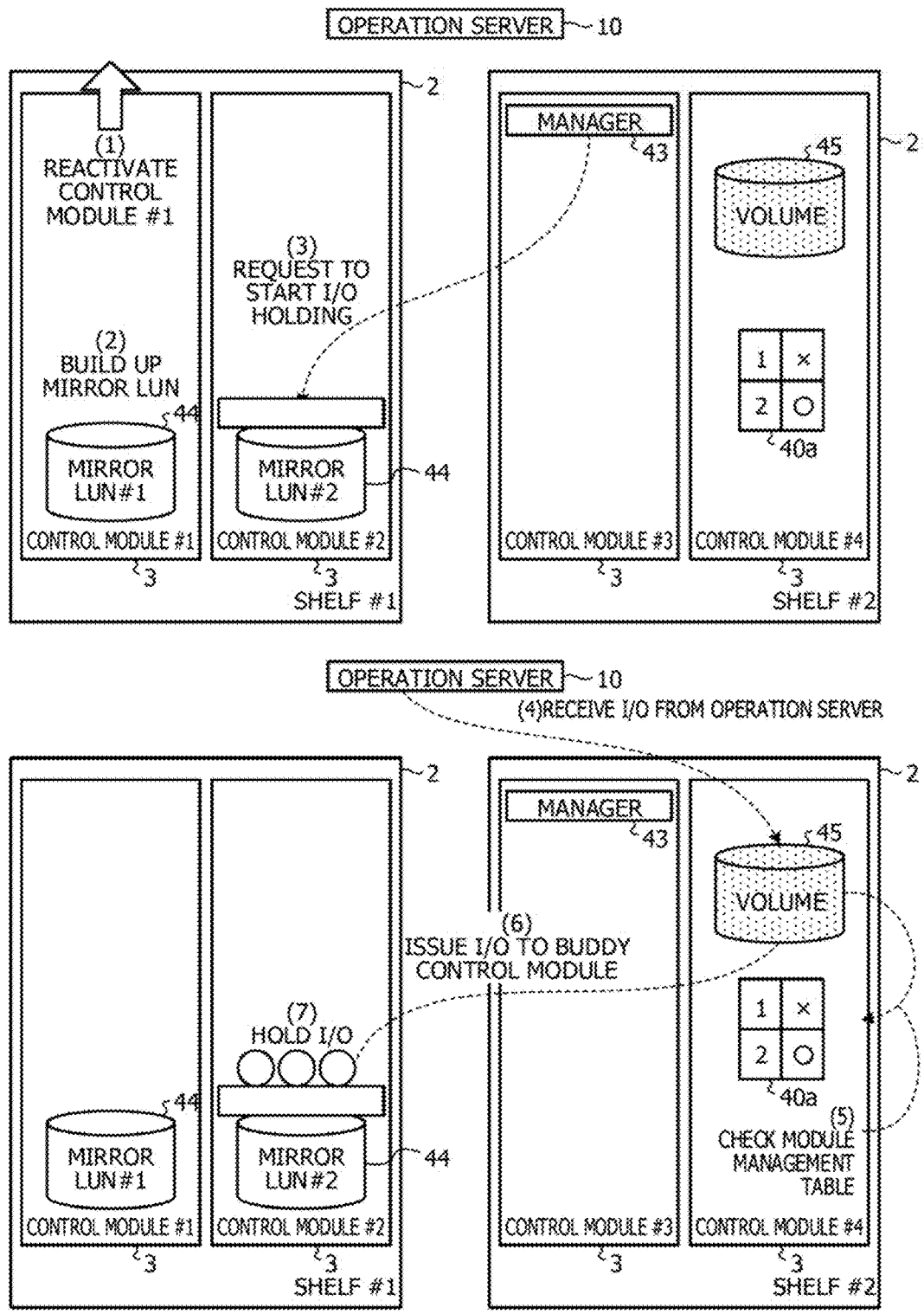
FIGS. 14A and 14B are diagrams for illustrating a flow of the I/O when a failed control module is reactivated.
Figure 14B:
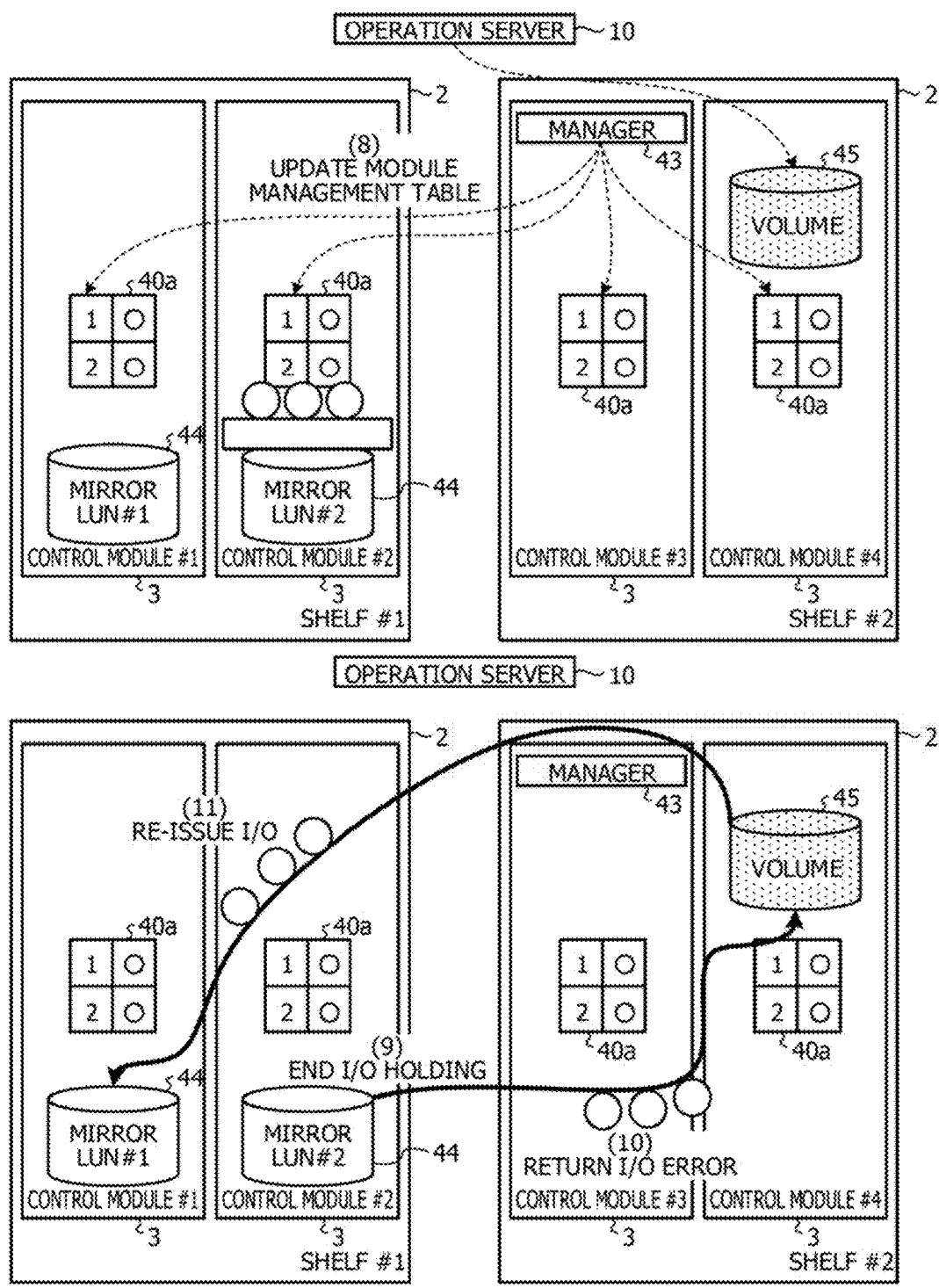

FIGS. 14A and 14B are diagrams for illustrating a flow of the I/O when a failed control module 3 is reactivated. As illustrated in FIG. 14A, when reactivated (1), the control module #1 builds up the mirror LUN 44 (2). The manager 43 instructs the control module #2 which has been processing the mirror LUN 44 in place of the control module #1 to start the I/O holding (3).

Then, the control module #4 receives the I/O for the volume 45 from the operation server 10 (4), and the volume processing unit 47 of the control module #4 checks the module management table 40a (5). Then, since the control module #1 is in failure, the volume processing unit 47 issues the I/O to the control module #2 which is a buddy control module 3 (6). Here, the control module #2 holds the I/O with no processing (7).

Then, as illustrated in FIG. 14B, the manager 43 instructs each control module 3 to update the module management table 40a, and the agent 42 of each control module 3 updates the module management table 40a (8). In FIG. 14B, state of the control module #1 is updated normally.

Then, the control module #2 ends the I/O holding (9), and returns an I/O error for the held I/O to the control module #4 (10). Then, the volume processing unit 47 of the control module #4 re-issues the I/O to the control module #1 with reference to the updated module management table 40a (11).

Figure 15:
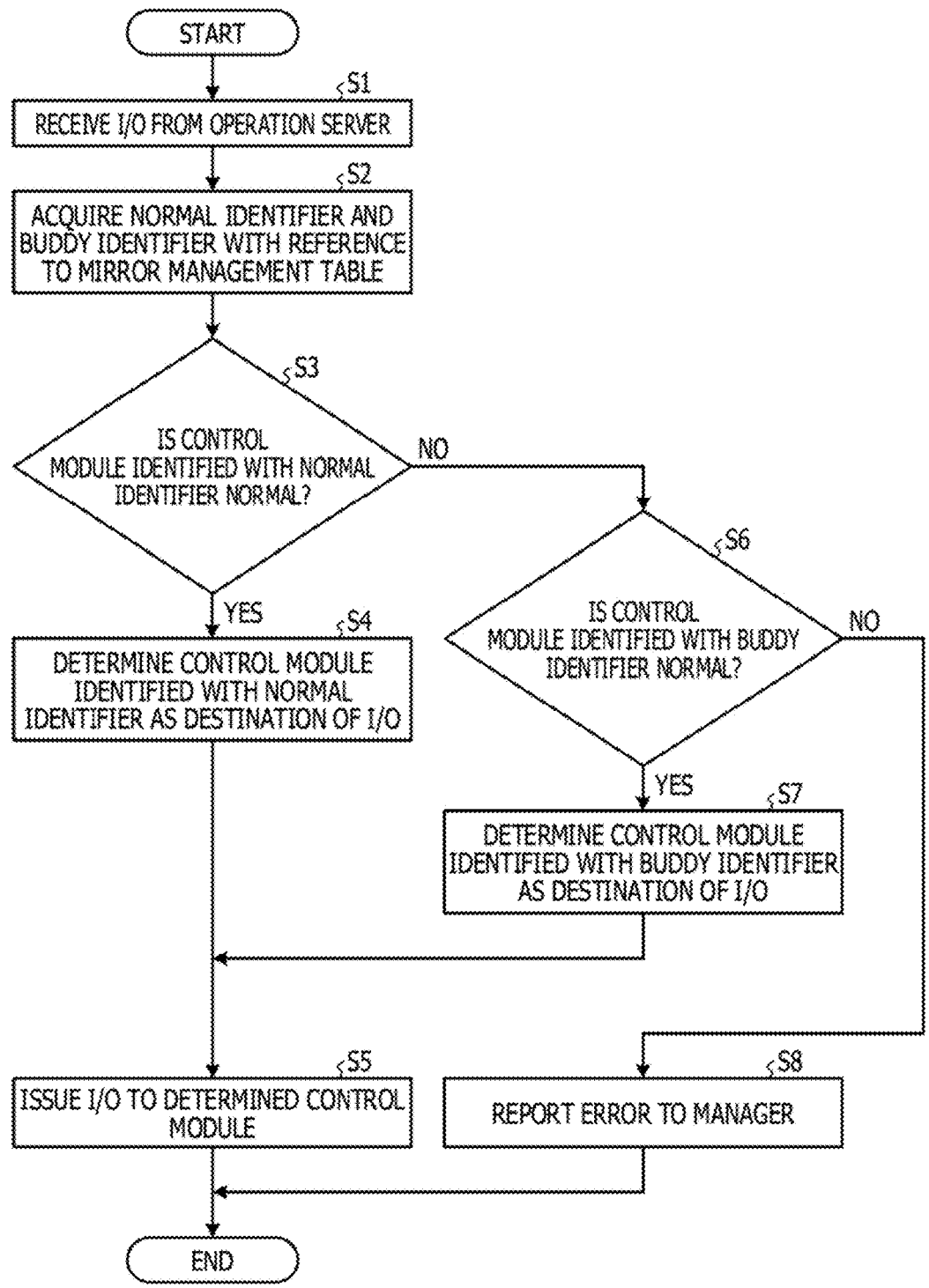
FIG. 15 is a flowchart illustrating a flow of an I/O issue processing by the volume processing unit.

Next, a flow of an I/O issue processing by the volume processing unit 47 is described. FIG. 15 is a flowchart illustrating a flow of the I/O issue processing by the volume processing unit 47. As illustrated in FIG. 15, the volume processing unit 47 receives the I/O from the operation server 10 (step S1).

Then, the volume processing unit 47 acquires the normal identifier and the buddy identifier for the I/O area with reference to the mirror LUN management table 40b (step S2). Then, the volume processing unit 47 determines with reference to the module management table 40a whether the control module 3 identified with the normal identifier is normal (step S3).

Then, when the control module 3 identified with the normal identifier is normal, the volume processing unit 47 determines the control module 3 identified with the normal identifier as the I/O destination (step S4), and issues the I/O to the determined control module 3 (step S5).

On the other hand, when the control module 3 identified with the normal identifier is not normal, the volume processing unit 47 determines with reference to the module management table 40a whether the control module 3 identified with the buddy identifier is normal (step S6).

Then, when the control module 3 identified with the buddy identifier is normal, the volume processing unit 47 determines the control module 3 identified with the buddy identifier as the I/O destination (step S7), and issues the I/O to the determined control module 3 (step S5). On the other hand, when the control module 3 identified with the buddy identifier is not normal, the volume processing unit 47 reports an error to the manager 43 (step S8).

Thus, the volume processing unit 47 determines the state of the control module 3 with reference to the module management table 40a, such that even when a failure occurs in the control module 3, the I/O is issued to an appropriate control module 3 without relying on the manager 43.

Figure 16:
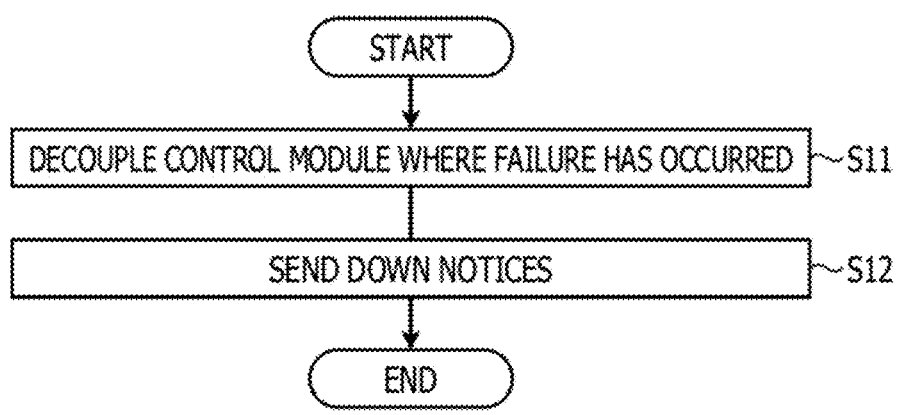
FIG. 16 is a flowchart illustrating a flow of a processing when a cluster detects a failure of the control module.

Next, a flow of a processing when the cluster 41 detects a failure of the control module 3 is described. FIG. 16 is a flowchart illustrating a flow of a processing when the cluster 41 detects a failure of the control module 3.

As illustrated in FIG. 16, upon detecting a failure of the control module 3, the cluster 41 decouples the control module 3 in which a failure has occurred (step S11). Then, the cluster 41 transmits a down notices notifying that the control module 3 where the failure has occurred is down, to all control modules 3 other than the control module 3 where the failure has occurred (step S12).

Figure 17:
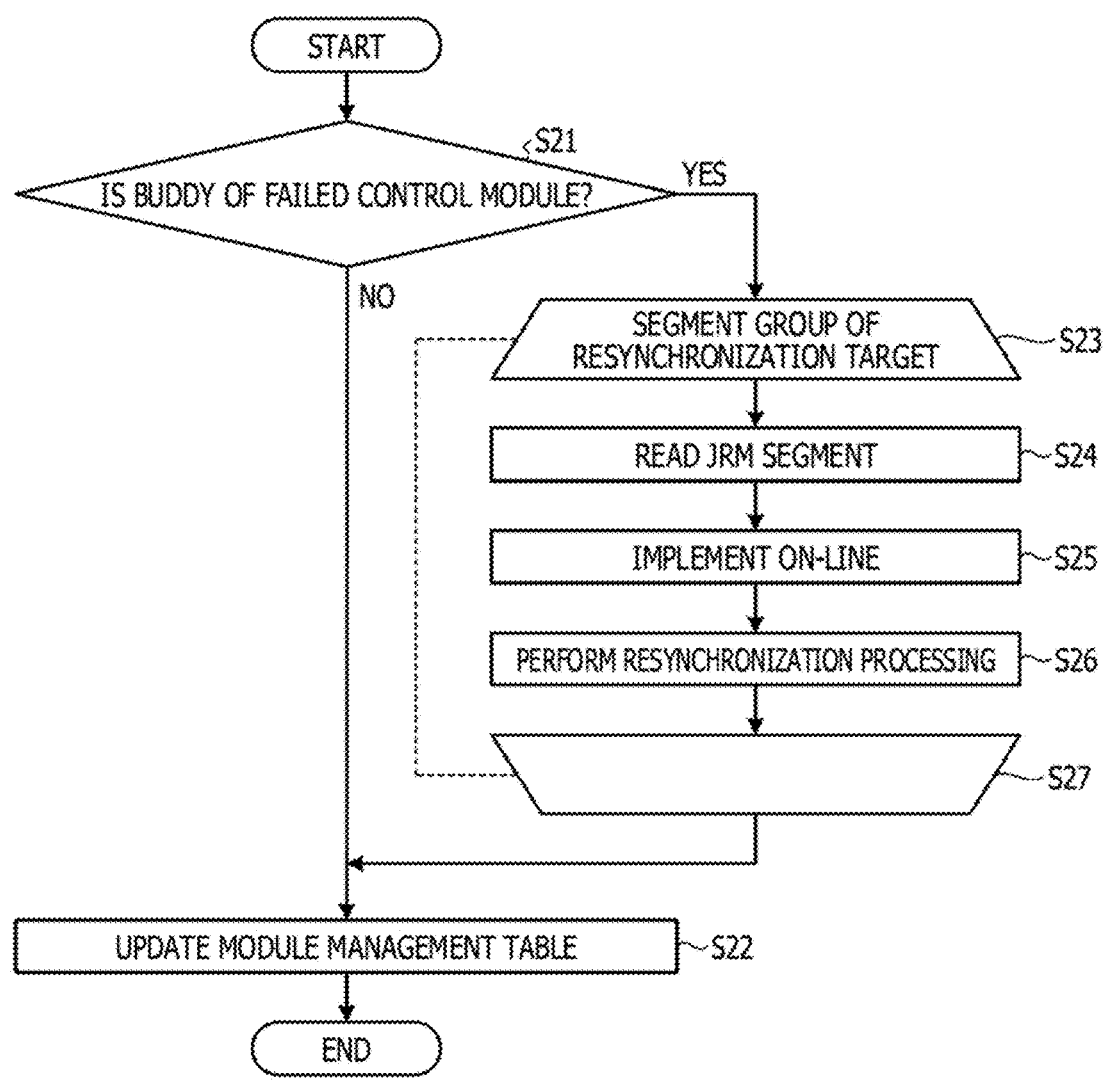
FIG. 17 is a flowchart illustrating a flow of a processing of an agent when a down notice is received.

FIG. 17 is a flowchart illustrating a flow of a processing of the agent 42 which has received the down notice. As illustrated in FIG. 17, upon receiving the down notice, the agent 42 of control modules 3 other than the control module 3 where the failure has occurred determines whether the self device is a buddy of the failed control module 3 (step S21). If determined that the self device is not a buddy, the agent 42 updates the module management table 40a (step S22), and ends the processing.

On the other hand, when determined that the self device is a buddy, the agent 42 performs processing of the step S23 to the step S27 for a segment group 46 of the resynchronization target. That is, the agent 42 reads the JRM segment 49 (step S24) and identifies the segment group 46 of the resynchronization target.

Then, the agent 42 implements on-line processing (step S25) and performs resynchronization processing (step S26). Then, the agent 42 updates the module management table 40a (step S22), and ends the processing.

Thus, upon detecting a failure of a control module 3, the cluster 41 transmits the down notices to all control modules 3 other than the control module 3 where the failure has occurred, and the agent 42 updates the module management table 40a. Therefore, even when a failure occurs in a control module 3, the storage system 1 may easily switch to a buddy control module 3 without relying on the manager 43.

Figure 18:
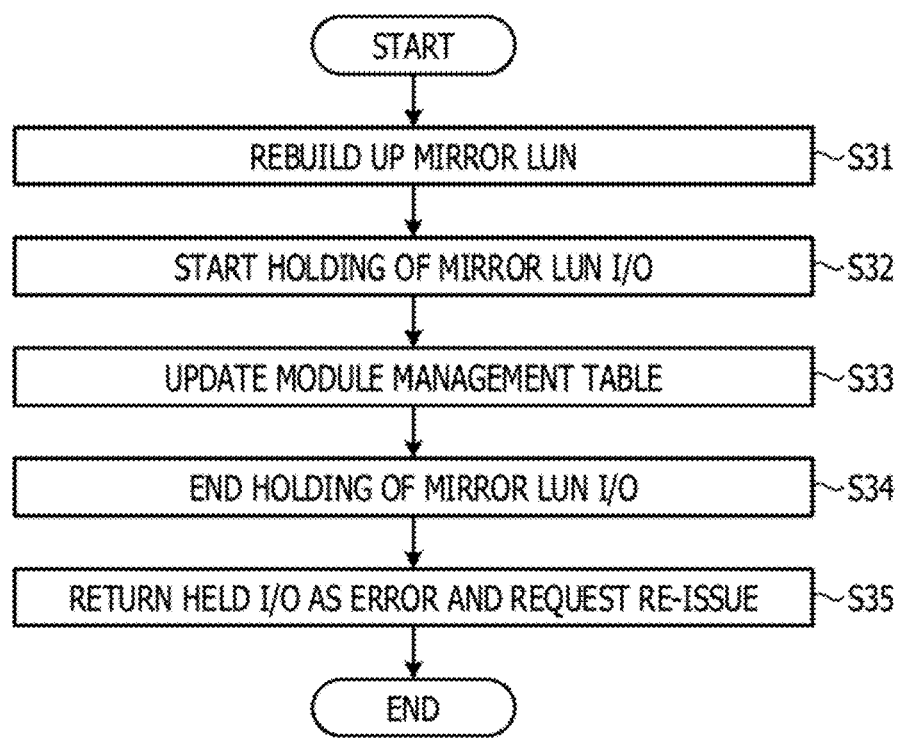
FIG. 18 is a flowchart illustrating a flow of a processing when the control module is reactivated.

Next, a flow of a processing when the control module 3 is reactivated is described. FIG. 18 is a flowchart illustrating a flow of a processing when the control module 3 is reactivated. As illustrated in FIG. 18, the reactivated control module 3 rebuilds up the mirror LUN (step S31).

Then, the switching source control module 3 starts holding of the mirror LUN I/O (step S32). Here, the mirror LUN I/O is an I/O issued to a control module 3 where the mirror LUN 44 exists. Then, each control module 3 updates the module management table 40a (step S33).

Then, the switching source control module 3 ends holding of the mirror LUN I/O (step S34). Then, the switching source control module 3 returns the held I/O as an error and requests re-issue of the I/O to a control module 3 to which the I/O has been issued (step S35).

Figure 19:
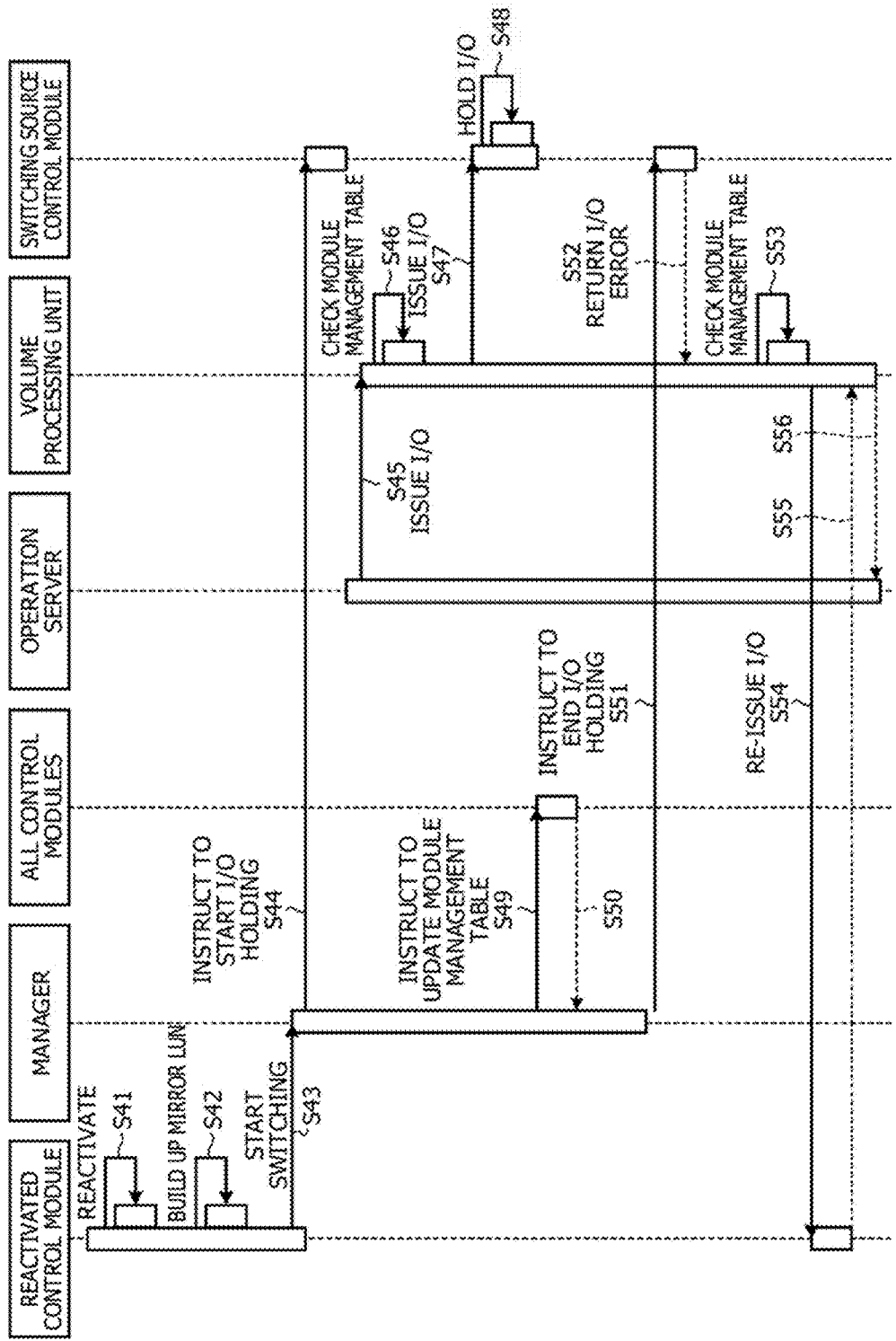
FIG. 19 is a sequence diagram illustrating a flow of the I/O when the control module is reactivated.

FIG. 19 is a sequence diagram illustrating a flow of the I/O when the control module 3 is reactivated. As illustrated in FIG. 19, the failed control module 3 is reactivated (step S41) and builds up the mirror LUN (step S42). Then, the reactivated control module 3 requests the manager 43 to start the switching (step S43).

Then, the manager 43 instructs the switching source control module 3 to start the I/O holding (step S44). Thereafter, when the operation server 10 issues the I/O (step S45), the volume processing unit 47 of a control module 3 which has received the I/O checks the module management table 40a (step S46), and issues the I/O to the switching source control module 3 (step S47). Then, the switching source control module holds the I/O (step S48).

The manager 43 instructs all control modules 3 to update the module management table 40a (step S49), and each control module 3 responds to the manager 43 by updating the module management table 40a (step S50). Then, the manager 43 instructs the switching source control module 3 to end the I/O holding (step S51). Then, the switching source control module 3 returns the I/O error for the held I/O (step S52).

Then, the volume processing unit 47, which has received the I/O error, checks the module management table 40a (step S53) and re-issues the I/O to the reactivated control module 3 (step S54). Then, after processing the I/O, the reactivated control module returns the response to the volume processing unit 47 (step S55), and the volume processing unit 47 returns the response to the operation server 10 (step S56).

Thus, when the failed control module 3 is reactivated, the switching source control module holds the I/O, and returns the I/O error when the module management table 40a is updated. Therefore, the synchronization of the storage system 1 is maintained without increasing the processing load of the manager 43 when the failed control module 3 is reactivated.

Although the embodiment is described by referring to its own function of the control module 3, a storage control program having the same function may be obtained by implementing the function of the control module 3 with a firmware. Thus, a hardware configuration of the control module 3 implementing the storage control program is described.

Figure 20:
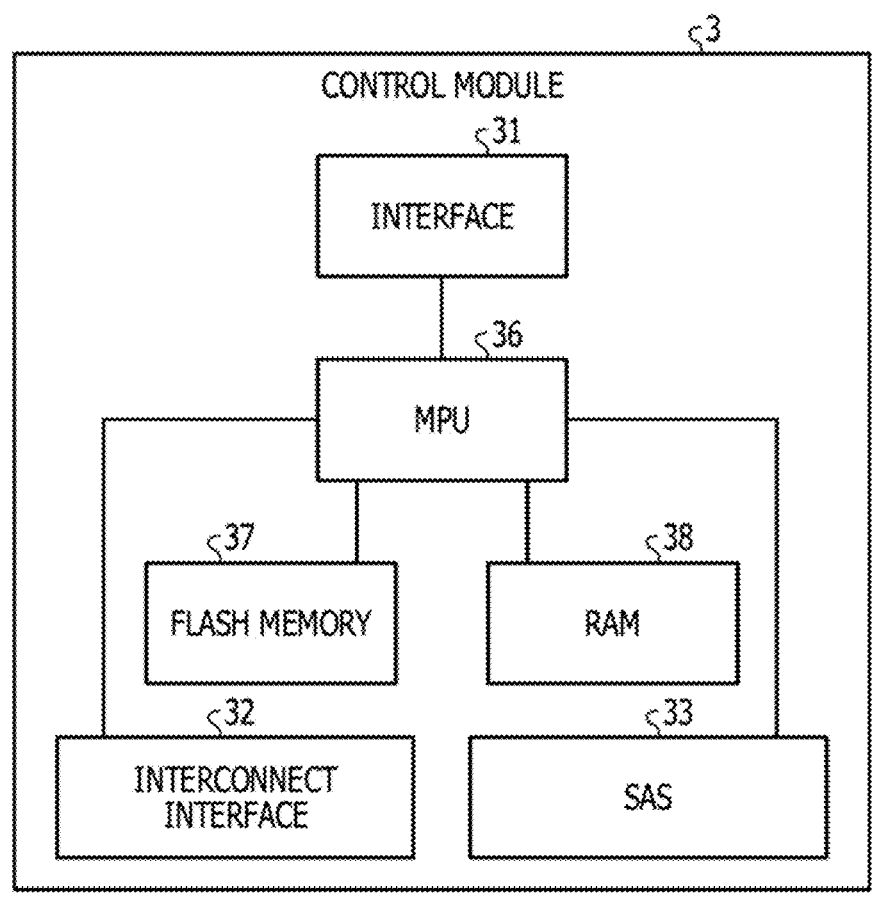
FIG. 20 illustrates a hardware configuration of a control module implementing the storage control program.

FIG. 20 illustrates a hardware configuration of the control module 3 implementing a storage control program according to the embodiment. As illustrated in FIG. 20, the control module 3 comprises the interface 31, the interconnect interface 32, and the SAS 33, which are illustrated in FIG. 5, plus a micro processing unit (MPU) 36, a flash memory 37, and a random access memory (RAM) 38.

The MPU 36 is a processing device configured to read and implement a firmware stored in the RAM 38. The flash memory 37 is a nonvolatile memory configured to store the firmware as the storage control program. The RAM 38 is a volatile memory configured to store the firmware read from the flash memory 37. The RAM 38 stores data in which are used for implementation of the firmware, halfway results of the firmware execution, and so on.

The storage device for storing the storage control program further includes a magnetic storage device, an optical disk, a magneto-optical recording medium, and so on. The magnetic storage device includes a hard disk drive (HDD), and so on. The optical disk includes a digital versatile disk (DVD), a DVD-RAM, a CD-ROM/RW, and so on. The magneto-optical recording medium includes a magneto-optical disk (MO), and so on.

When distributing the storage control program, a portable recording medium such as, for example, a DVD or a CD-ROM in which the storage control program is recorded is marketed. The storage control program may be stored in a storage device of a server computer and transferred from the server computer to the control module 3 via a network.

The control module 3 stores, for example, a storage control program recorded in a portable recording medium or a storage control program transferred from a server computer into the flash memory 37. Then, the MPU 36 reads the storage control program from the flash memory 37 and executes the processing according to the storage control program. The MPU 36 may read the storage control program directly from a portable recording medium and execute the processing according to the storage control program.

As described above, in the embodiment, the normal identifier and the buddy identifier are associated with each other for each of the segment groups 46 in the mirror LUN management table 40b, and the identifier of the control module 3 and the state information are associated with each other in the module management table 40a. Then, based on the mirror LUN management table 40b and the module management table 40a, the volume processing unit 47 determines a control module 3 performing the processing of the mirror LUN and issues the I/O to the determined control module 3. Therefore, even when a failure occurs in a control module 3, the storage system 1 easily switches the control module 3 performing the processing of the mirror LUN 44 without relying on the configuration information managed by the manager 43. This reduces processing time in the storage system 1 when a failure occurs.

In the embodiment, the agent 42 updates the module management table 40a based on the down notice from the cluster 41. Therefore, failure state of the control module 3 is promptly reflected on the module management table 40a in the storage system 1.

In the embodiment, the agent 42 of the buddy control module 3 performs the resynchronization processing based on the down notice from the cluster 41. Therefore, even when a failure occurs, synchronization of the mirror data is maintained in the storage system 1.

In the embodiment, when a failure has occurred in a control module performing the processing of the mirror LUN 44, the volume processing unit 47 receives the I/O error and re-issues the I/O to the buddy control module 3. Therefore, even when a control module 3 performing the processing of the mirror LUN 44 is down after the I/O has been issued thereto, the issued I/O is certainly processed in the storage system 1.

In the embodiment, when the failed control module 3 is restored, the agent 42 updates the module management table 40a. Therefore, the control module 3 performing the processing of the mirror LUN is easily re-coupled in the storage system 1.

In the embodiment, when the failed control module 3 is restored, the buddy control module 3 holds the I/O, and returns an error for the held I/O after the module management table 40a has been updated. Therefore, when the failed control module 3 is restored, destruction of the synchronization in the storage system 1 is avoided. Further, when the failed control module 3 is restored, the steps of processing performed by the manager 43 for maintaining the synchronization in the storage system 1 is reduced. Thus, this avoids the processing by the manager 43 from becoming a bottleneck for the failure restoration and reduces the time for failure restoration in the storage system 1.

In the embodiment, the shelf 2 comprises two control modules 3. However, the embodiment is not limited thereto, and may be applied in the same manner even when the shelf 2 comprises three or more control modules 3. Also, in the embodiment described above, one of two control modules 3 in the same shelf 2 becomes a buddy control module 3 of another control module 3. However, the embodiment is not limited thereto, and may be applied in the same manner even when a control module 3 in a still another shelf 2 becomes a buddy control module 3.

The agent 42 of the buddy control module 3 may perform the resynchronization processing only when the access attribute of the segment group 46 is not Read Only and the number of mirror surfaces is two or more. The reason is that the synchronization is not destructed when access from the volume processing unit 47 is Read Only or when the number of mirror surfaces is 1, and therefore these segment groups 46 may be excluded from the target of the resynchronization.

Even when a control module 3 is reactivated after all control modules 3 are down, restoration processing is desirable to be performed since the synchronization might have been destructed. When both the normally used control module 3 and the buddy control module 3 are reactivated simultaneously, restoration processing is desirable to be performed only on one of the control modules since the synchronization is destructed if the resynchronization is performed on both of the control modules. The cluster 41 manages all control modules 3 which are synchronized, and therefore is not able to recognize a specific configuration of the normally used control module 3 and the buddy control module 3. Since only the manager 43 is capable of recognizing the configuration, when all control modules 3 are down, the manager 43 performs the resynchronization processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage controller out of a plurality of storage controllers used in a storage system, each of the plurality of storage controllers being configured to control mirror processing of data, the storage controller comprising:
   circuitry configured to:
      determine a storage controller of a destination of an input and output request for a volume, out of the plurality of storage controllers, based on mirror device information where identifiers and priorities of the respective storage controllers are stored while being associated with each other for each of mirror processing units, and state information being for each of storage controllers and indicating whether the storage controller is normal or not, and
      issue the input and output request to the determined storage controller.

2. The storage controller according to claim 1, wherein the circuitry is configured to:
   update the state information such that the state information indicates that state of the determined storage controller is abnormal when a failure occurs in the determined storage controller.

3. The storage controller according to claim 2, wherein the circuitry is configured to:
   execute resynchronization processing between mirror data when a failure occurs in a storage controller performing mirror processing out of a storage controller group associated with one mirror processing unit in the plurality of storage controllers.

4. The storage controller according to claim 2, wherein the circuitry is configured to:
   determine another storage controller of a re-destination of the input and output request out of the plurality of storage controllers, based on the updated state information and the mirror device information upon receiving an error response to the input and output request when a failure occurs in the determined storage controller, and
   issue the input and output request to the determined other storage controller.

5. The storage controller according to claim 2, wherein the circuitry is configured to:
   update the state information such that the state information indicates that state of the determined storage controller is normal when the determined storage controller is restored from the failure.

6. The storage controller according to claim 5, wherein the circuitry is configured to:
   instruct the other storage controller to hold issuing of an input and output request until the state information is updated when the determined storage controller is restored from the failure.

7. A method executed in a storage controller out of a plurality of storage controllers used in a storage system, each of the plurality of storage controllers being configured to control mirror processing of data, the method comprising:
   determining a storage controller of a destination of an input and output request for a volume, out of the plurality of storage controllers, based on mirror device information where identifiers and priorities of the respective storage controllers are stored while being associated with each other for each of mirror processing units, and state information being for each of storage controllers and indicating whether the storage controller is normal or not; and
   issuing the input and output request to the determined storage controller.

8. The method according to claim 7, further comprising:
   updating the state information such that the state information indicates that state of the determined storage controller is abnormal when a failure occurs in the determined storage controller.

9. The method according to claim 8, further comprising:
   executing resynchronization processing between mirror data when a failure occurs in a storage controller performing mirror processing out of a storage controller group associated with one mirror processing unit in the plurality of storage controllers.

10. The method according to claim 8, further comprising:
    determining another storage controller of a re-destination of the input and output request out of the plurality of storage controllers, based on the updated state information and the mirror device information upon receiving an error response to the input and output request when a failure occurs in the determined storage controller; and
    issuing the input and output request to the determined other storage controller.

11. The method according to claim 8, further comprising:
    updating the state information such that the state information indicates that state of the determined storage controller is normal when the determined storage controller is restored from the failure.

12. The method according to claim 11, further comprising:
    instructing the other storage controller to hold issuing of an input and output request until the state information is updated when the determined storage controller is restored from the failure.

13. A non-transitory storage medium storing a program for causing a storage controller out of a plurality of storage controllers used in a storage system to execute a process, each of the plurality of storage controllers being configured to control mirror processing of data, the process comprising:
- determining a storage controller of a destination of an input and output request for a volume, out of the plurality of storage controllers, based on mirror device information where identifiers and priorities of the respective storage controllers are stored while being associated with each other for each of mirror processing units, and state information being for each of storage controllers and indicating whether the storage controller is normal or not; and
- issuing the input and output request to the determined storage controller.

14. The non-transitory storage medium according to claim 13, wherein the process further includes:
- updating the state information such that the state information indicates that state of the determined storage controller is abnormal when a failure occurs in the determined storage controller.

15. The non-transitory storage medium according to claim 13, wherein the process further includes:
- executing resynchronization processing between mirror data when a failure occurs in a storage controller performing mirror processing out of a storage controller group associated with one mirror processing unit in the plurality of storage controllers.

16. The non-transitory storage medium according to claim 13, wherein the process further includes:
- determining another storage controller of a re-destination of the input and output request out of the plurality of storage controllers, based on the updated state information and the mirror device information upon receiving an error response to the input and output request when a failure occurs in the determined storage controller; and
- issuing the input and output request to the determined other storage controller.

17. The non-transitory storage medium according to claim 13, wherein the process further includes:
- updating the state information such that the state information indicates that state of the determined storage controller is normal when the determined storage controller is restored from the failure.

18. The non-transitory storage medium according to claim 17, wherein the process further includes:
- instructing the other storage controller to hold issuing of an input and output request until the state information is updated when the determined storage controller is restored from the failure.

* * * * *